(12) United States Patent
Wilcox

(10) Patent No.: US 6,619,431 B2
(45) Date of Patent: Sep. 16, 2003

(54) FLUID REGULATING DEVICE

(76) Inventor: William S. Wilcox, 72 Richmond Crescent, Stoney Creek, Ontario (CA), L8E 5T9

( * ) Notice: Subject to any disclaimer, the term of this patent is extended or adjusted under 35 U.S.C. 154(b) by 0 days.

(21) Appl. No.: 09/878,628

(22) Filed: Jun. 11, 2001

(65) Prior Publication Data

US 2001/0027900 A1 Oct. 11, 2001

Related U.S. Application Data

(63) Continuation-in-part of application No. 09/342,194, filed on Jun. 29, 1999, now Pat. No. 6,244,389, and a continuation-in-part of application No. PCT/CA00/00768, filed on Jun. 28, 2000.

(51) Int. Cl.⁷ .......................... F01M 11/00; F16N 21/02
(52) U.S. Cl. ................................................... 184/105.3
(58) Field of Search ........................... 184/29, 59, 79, 184/103.1, 105.1, 105.2, 105.3; 137/14, 517

(56) References Cited

U.S. PATENT DOCUMENTS

| 1,805,303 A | 5/1931 | Barks | |
|---|---|---|---|
| 1,961,051 A | 5/1934 | Kerns | 184/7 |
| 2,007,169 A | 7/1935 | Kerns | 184/7 |
| 2,283,638 A | 5/1942 | Klein et al. | 184/7 |
| 2,720,283 A | 10/1955 | Lares | 184/105 |
| 2,938,756 A | 5/1960 | Loeb | 308/122 |
| 3,642,020 A | 2/1972 | Payne | 137/112 |
| 3,664,462 A * | 5/1972 | Smith, Sr. | 184/29 |
| 3,687,153 A | 8/1972 | Gold | 137/112 |
| 3,747,626 A | 7/1973 | Valentino | 137/102 |
| 3,756,349 A | 9/1973 | Kluh | 184/105 B |
| 3,963,047 A | 6/1976 | Moring | 137/596 |
| 4,332,309 A * | 6/1982 | Bereit | 184/39.1 |
| 4,448,211 A | 5/1984 | Yoshida | 137/112 |
| 4,452,188 A | 6/1984 | Kosuda et al. | 123/90.18 |
| 4,467,825 A | 8/1984 | Boyd | 137/112 |
| 4,589,524 A | 5/1986 | Laycock | 184/103.1 |
| 5,449,051 A | 9/1995 | Liao | 184/55.1 |
| 5,562,123 A * | 10/1996 | Howard | 184/103.1 |
| 5,598,902 A * | 2/1997 | Lin | 184/105.3 |
| RE35,842 E | 7/1998 | Ehlert | 184/6.26 |
| 6,079,519 A | 6/2000 | Lottes | 184/105.1 |

OTHER PUBLICATIONS

U.S. patent application Ser. No. 09/342,194, Wilcox, filed Jun. 29, 1999.

* cited by examiner

Primary Examiner—Rodney H. Bonck
(74) Attorney, Agent, or Firm—Vidas, Arrett & Steinkraus, P.A.

(57) ABSTRACT

There is provided a fluid regulating device for use in regulating fluid in a fluid-using device, the fluid regulating device comprising: a receiver, to receive fluid under pressure from an external source, a vent, to vent fluid from the fluid-using device, and a regulator, operatively connected between the receiving device and the fluid-using device, to regulate a pressure of the fluid, wherein, upon fluid being received by the receiving device, the valve assembly directs the fluid to the fluid-using device at the regulated pressure.

25 Claims, 15 Drawing Sheets

FLUID REGULATING DEVICE

This is a continuation-in-part of application Ser. No. 09/342,194 filed Jun. 29, 1999, now U.S. Pat. No. 6,244,389, the contents of which are hereby incorporated by reference. This application is also a continuation-in-part of PCT Application No. PCT/CA00/00768, filed Jun. 28, 2000 the contents of which are hereby incorporated by reference.

FIELD OF THE INVENTION

This invention relates generally to the field of lubrication, and more particularly to a system for managing lubrication in a lubricated device such as a bearing block.

BACKGROUND OF THE INVENTION

Lubricated devices are a pervasive and necessary component of modern machinery. In industrial applications, lubricated devices in the form of relubricatable bearing blocks (also called "bearing units" or just "bearings") are often used. These devices generally require regular re-lubrication to operate efficiently. In practice, bearings are often over-lubricated beyond the manufacturer's recommended maximum. This is a problem, because over-lubrication can cause the generation of excess heat, inefficient operation, and possibly complete failure of the bearing. Bearing failure can be very costly, as it involves not only replacement or repair of the bearing and any related damaged equipment, but also production downtime. Accordingly, it is critical to manage the amount of lubrication present in relubricatable bearings to reduce the risk of premature and spontaneous bearing failure.

Most industrial grade bearings comprise a housing with a central bore, into which is inserted a radial bearing having a smaller, inner bore. The radial bearing has an outer ring fixed to the outer bore of the housing, and an inner ring that attaches to and rotates with the shaft being operated. Between the rings is a cage separator containing rolling elements such as balls or rollers. Lubrication injected into the radial bearing provides a low-friction surface for the rolling elements and rotating inner ring. There is also a seal or other enclosure, usually made of rubber, in the shape of a ring whose outer edge attaches to the outer bore and whose inner edge rides the shaft. The seal keeps lubrication in, and external contaminants such as moisture, dust, or other airborne particles, out of the radial bearing.

There is a conduit in the housing to permit injection of externally supplied lubrication into the radial bearing. Stand-alone or independent bearings commonly have a standard ZERK™ fitting to accept a grease gun. Relubrication of such bearings accordingly requires specific, periodic attention by maintenance personnel. Bearings that are part of central lubrication systems, where a group of bearings receive electronically controlled grease injections, have a permanent connection to a grease input line. While these bearings do not require specific individual attention, a sophisticated electronic system to control the injection of fresh grease is usually needed.

When a bearing starts up, it generates heat that liquefies the grease. An oil separation layer is created that allows the rolling elements to spin with minimal metal-to-metal contact, and stabilizes the temperature inside the radial bearing. However, if the bearing is over-lubricated, there is a churning effect that generates excess heat. This can cause the internal components to expand, leading to more metal-to-metal contact and generation of more heat. In that case the temperature may fail to stabilize, and could rise to the point where it breaks down the oil separation layer, causing the bearing to fail, or seize up.

Bearing failure can also be exacerbated by the presence of contaminants that enter the bearing through gaps in the seal. Gaps can occur due to wear and tear, an imperfect fit between the seal and bearing, or from the stress imposed by the build-up of pressure inside the bearing. Since over-lubrication of the bearing raises internal pressure, it may cause lubrication to leak out under pressure through the gaps, and may expand the gaps themselves. Further, external contaminants can get actively sucked in if there is a rapid drop in pressure inside the bearing. This can happen, for example, if a hot bearing is cooled down rapidly by a water spray, rather than allowed to gradually cool down on its own. The bearing components shrink as they cool, creating a vacuum and drop in pressure.

A bearing can fail quickly if there is a large rise in pressure which "blows-out" the seal, for example, by using a high pressure grease gun. A blow-out creates a large hole in the seal, causing a rapid loss of lubrication and ingress of contaminants. Bearing failure can also occur by a slower process of attrition, especially if there is over-lubrication. For example, gaps in the seal may allow some grease to leak out on start-up, and some contaminants to enter, causing incremental deterioration of the bearing. Too rapid a cool-down may draw in more contaminants. The process may repeat over several cycles of start-up and cool-down, until the bearing fails. However bearing failure occurs, it is clear that over-lubrication of the bearing can be a major factor, due to the rise in heat and pressure, and possible leakage of lubrication that it causes.

Even though over-lubrication is a recognized cause of bearing failure, it can be difficult to avoid in practice on the factory floor. One reason is that many operators are by inclination more concerned about the risk of inadequate lubrication, and so are predisposed to keep adding grease. Also, the initial rise in temperature that occurs on start-up, while conventional and not damaging, may be misunderstood by maintenance personnel, who unnecessarily inject more lubrication into the bearing to ensure that it is adequately lubricated. Another type of problem is that operators who are aware of this issue may refrain from adding grease to a bearing whose lubrication level is unknown, such as a bearing brought out of storage or repair. Ironically, these bearings may have too little grease to function properly, and could fail for that reason. Over-lubrication is therefore a persistent problem that is difficult to avoid, even by knowledgeable operators who intend to take every possible precaution.

These problems have not been addressed by the prior art, most of which is directed to the limited issue of controlling the amount of lubricant being provided in a given injection. For example, U.S. Pat. No. 2,283,638 to Klein is directed to a lubrication injector. This device teaches that a metered amount of lubricant can be injected into the bearing. Another patent is Kerns, U.S. Pat. No. 1,961,051 which is directed to a lubricating device which can be operated to fill one side of a valve, and then the other side of the valve, to provide a metered flow of lubrication to a bearing. Similarly, some central lubrication systems, using sophisticated electronic controls, try to resolve the problem by dispensing measured amounts of lubrication at regular intervals. However, this approach is ineffective because the amount of lubricant injected can only be an estimate of the amount that, it is assumed, may have leaked out in the preceding interval. Over-lubrication can occur through repeated injection of measured amounts, just as it can occur by a single injection of an excessive amount. In addition, the electronic controls required for this approach are complicated and prone to breakdown.

Another approach used by some central lubrication systems is to run a vent line from each radial bearing to a central manifold. However, since this line is open at all times, newly injected fresh grease will often get vented out rather than remain in the radial bearing. Accordingly, the bearings in this system can be deprived of fresh grease and deteriorate at a faster rate.

In the absence of any overall system to manage the flow of lubrication, the risk remains that excess lubrication will continue to be injected into bearings, causing further breakdowns.

SUMMARY OF THE INVENTION

What is desired is a lubrication control system that manages or regulates the amount of grease in a lubricated device such as a bearing throughout the cycle of operation. Ideally, the lubrication control system would safely vent any excess grease present at start-up or at any time during operation, and draw back in grease, and not atmospheric contaminants, if there is a vacuum created when the bearing is shut down and cooling off. The lubrication control system should be easily integrated with bearing blocks currently in use so that there would be no need for expensive retrofitting or replacement. It would also be advantageous for the lubrication control system to be connected to a source that contains clean grease, so that the grease that is vented from and into the bearing block would not be mixed with and contaminated by airborne particles.

In accordance with the present invention, there is provided a lubrication vent block for use in managing lubrication in a lubricated device, the lubrication vent block comprising; a receiving means, to receive lubrication from an external source, a vent means, to vent lubrication from the lubricated device, and a valve means, for controlling the passage of lubrication through said lubrication vent block to said lubricated device, wherein, upon lubrication being received by said receiving means, said valve means directs said lubrication to the lubricated device, and wherein, upon an excess of lubrication being received by the lubricated device, said excess lubrication may be directed out of said lubricated device to said vent means by said valve means.

In a further embodiment of the present invention, there is added a second valve means biased to block the flow path through the vent means when the lubricated device is not operating or in balanced operation.

In a further embodiment of the present invention, there is added means for integrating the lubrication vent block into the construction of the lubricated device such as a bearing block, so it would not need to be connected as an external attachment.

In a further embodiment of the present invention, there is added means for connecting multiple lubricated devices such as bearing blocks to a single lubrication vent block, so that more than one bearing block could receive grease through injection into a single grease input, and so that a single lubrication reservoir could accept vented grease from multiple bearing blocks.

In a further embodiment of the present invention, there is provided a fluid regulating device for use in regulating fluid in a fluid-using device, said fluid regulating device comprising: a receiving means, to receive fluid under pressure from an external source, a vent, operatively connected to said fluid-using device, to vent fluid from the fluid regulating device, a valve assembly, for limiting the passage of fluid through said fluid regulating device, and a regulator, operatively connected between said receiving means and said fluid-using device, to regulate a pressure of said fluid, wherein, upon fluid being received by said receiving means, said valve assembly directs said fluid to said fluid-using device at said regulated pressure.

DETAILED DESCRIPTION OF THE PREFERRED EMBODIMENTS

Figure 1:
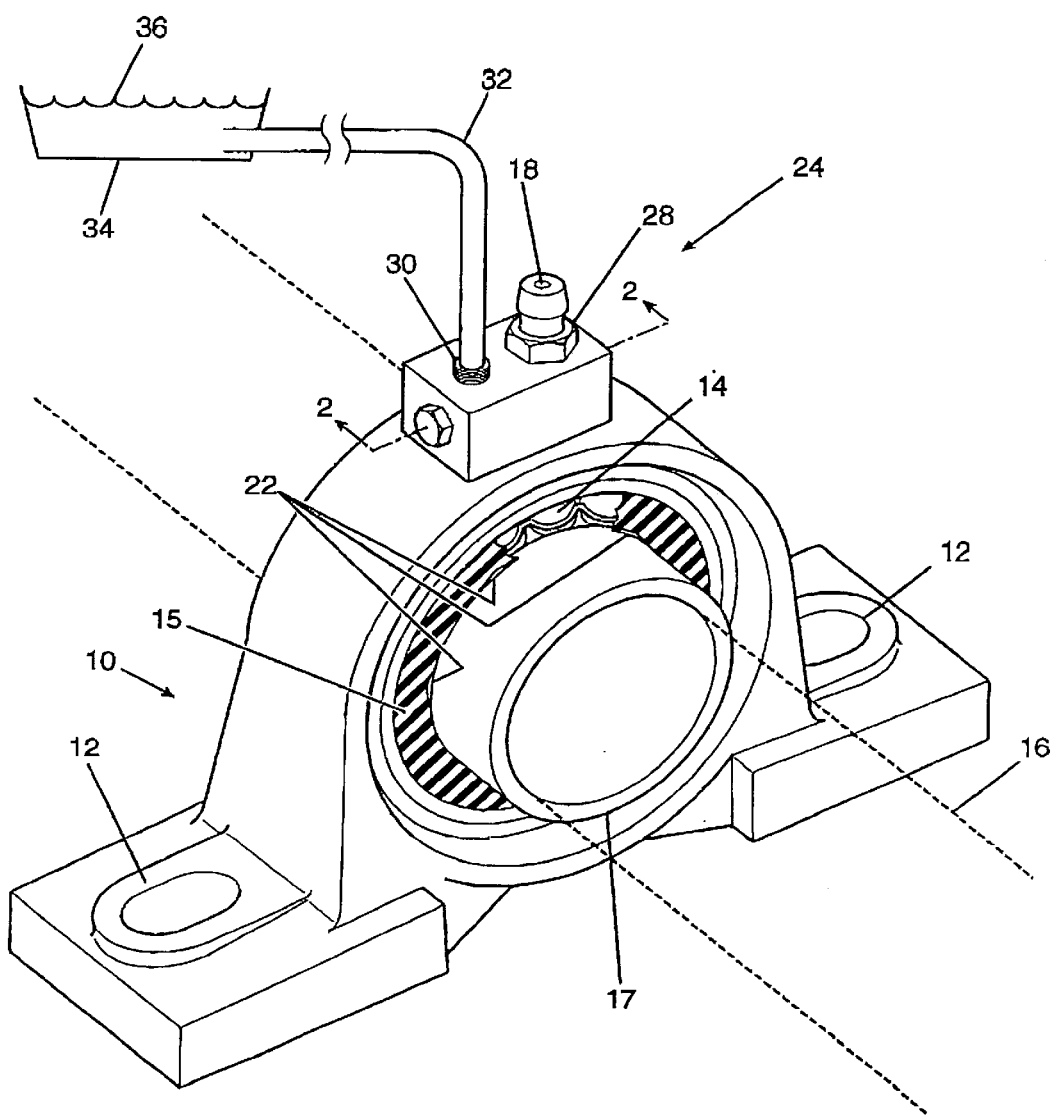
FIG. 1 is a perspective view of a lubrication vent block in accordance with the present invention, positioned in connection with a representative bearing block.

An overview of the present invention, and its integration with a lubricated device such as a bearing block, is shown in FIG. 1. For added clarity, FIG. 1a shows the same view as FIG. 1 but with the present invention separated from the bearing block.

Figure 1A:
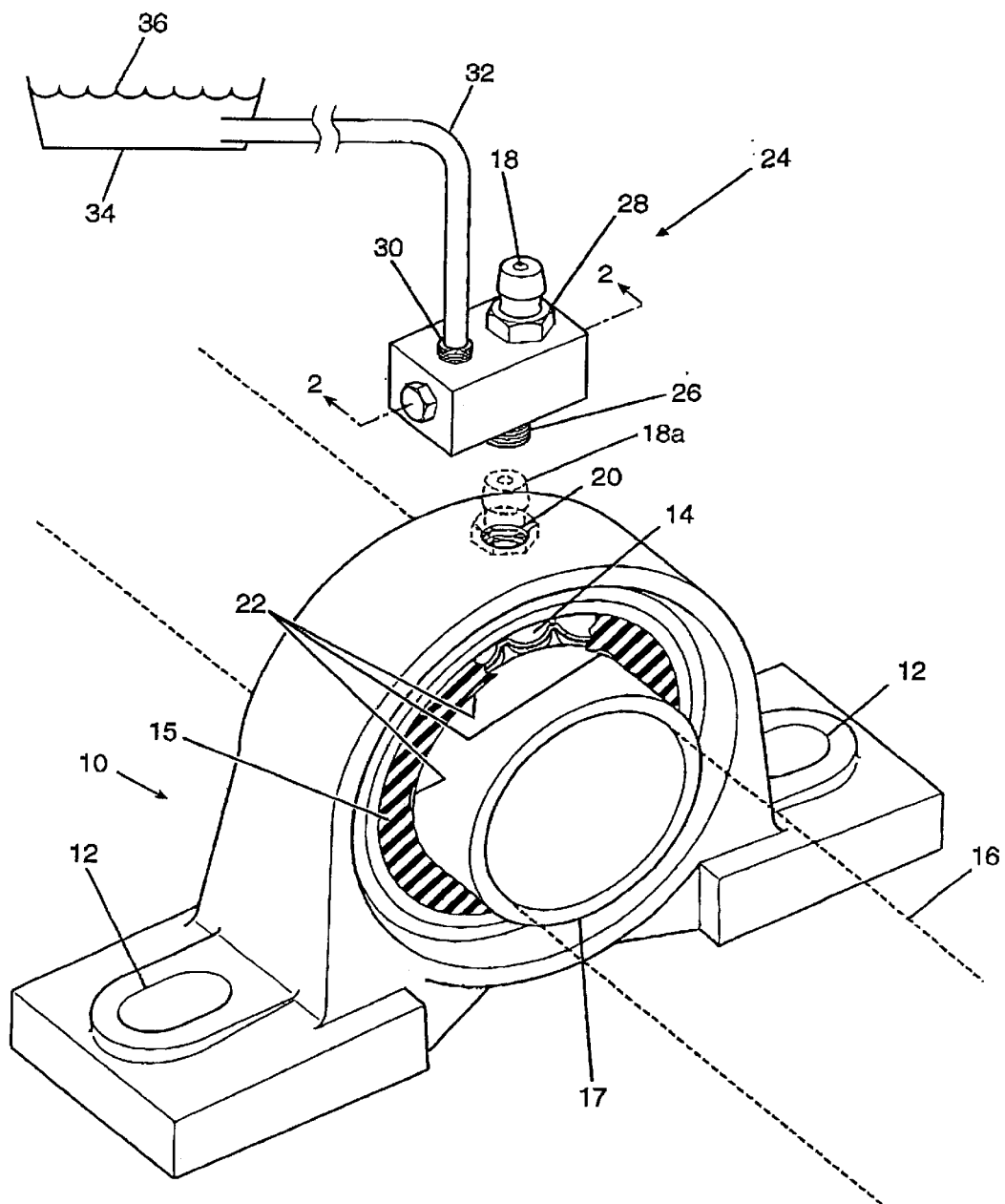
FIG. 1a is the same view as FIG. 1, with the lubrication vent block shown in a position separate and apart from the representative bearing block.

A bearing block 10 shown in FIGS. 1 and 1a is a representative example of the bearing blocks or units in common use. The bearing block 10 may be clamped onto a fixed surface through bolts inserted in holes 12. A radial bearing 14 is centred in the block 10, and encircles a bore through which a shaft 16, shown in outline form, may be inserted. The radial bearing 14 includes an inner ring extension 17, and is covered by a seal 15 that insulates the rolling elements and lubricant from the external environment. The drawings show the seal 15 made of rubber, however metal seals are also used. The inner ring extension 17 is the only part of the radial bearing 14 that projects outside the seal. In FIGS. 1 and 1a a section of the seal 15 has been cut out for illustration purposes, to enable the otherwise hidden rolling elements and cage separator of the radial bearing 14 to be seen. Not shown in FIGS. 1 and 1a is a metal protector, commonly called a "flinger", that in many bearings rides with the shaft and protects the seal from environmental or mechanical damage. It will be appreciated that this particular bearing configuration, with an inner ring extension and metal flinger, is representative of only one type of bearing block to which the present invention applies. The lubrication vent block of the present invention is applicable to any relubricatable bearing system, regardless of configuration.

As shown in FIG. 1a, the radial bearing 14 in a conventional bearing block receives injections of fresh grease, or lubricant, through a representative input fitting or grease fitting 18a, shown in outline form, which is screwed into a threaded housing 20 that is built into the bearing block 10. The grease fitting 18a will accept a grease gun, if used with a stand-alone bearing, or a feed line if used with a central lubrication system. Also shown are gaps 22. The gaps could be any type of clearance, crack, open space, or seepage point within the seal 15 or between the seal 15 and adjacent elements of the bearing block. In practice, the gaps 22 are most likely to be clearances between the seal 15 and shaft 16 that result from a seal that is damaged, poorly fitted, or worn by excessive use.

In the representation of a conventional bearing block system shown in FIG. 1a, the grease fitting 18a is the only structured external connection between the radial bearing 14 and the outside environment. As shown in more detail below, this connection operates one-way only, so that grease can enter the block through this path but cannot leave. The gaps 22 provide a two-way, but highly unstructured path through which grease or other particles may pass.

A lubrication vent block 24 comprising the present invention is also shown in FIGS. 1 and 1a. The lubrication vent block 24 is shown as having three external connections, or connection means, each of which is embodied in the figures as a threaded housing. As shown in FIG. 1a, the lubrication vent block 24 as a whole connects to the bearing block through a first connection means, or output connector, shown as threaded housing 26, which connects with threaded housing 20 of the bearing block. As a result, the grease fitting 18 or 18a that would otherwise have connected directly to threaded housing 20 in a conventional system, is instead connected to threaded housing 28, which is a second connection means of the lubrication vent block 24. A third connection means, threaded housing 30 of the lubrication vent block 24 represents a third external connection, one that has no counterpart in the conventional bearing block system. As shown in FIGS. 1 and 1a, threaded housing 30 connects the lubrication vent block 24 to a vent line 32, that in turn connects to a fluid or lubrication reservoir 34 containing a supply of grease 36.

The body of the lubrication vent block 24 is most commonly constructed of metal or high impact plastic. However, it can be appreciated by someone skilled in the art that any durable material that can contain internal conduits and external connections to manage the flow of fluid may be used. The external connections, or connection means, may be any convenient connector that will accept a grease gun, feed line, or other grease input device, attach to a bearing block, or connect to an external vent line. For example, a "quick disconnect" or "snap-on" connector might be used to connect a grease gun. Threaded housings made of metal are typically used since they are the most common connectors currently in use. The vent line 32 may be a hollow plastic tube connected by an adaptor to the threaded housing. It can also be appreciated that in a multiple bearing block system, a central lubrication system that employs a common grease source and a common lubrication reservoir may be used instead of dedicated devices or lines.

The lubrication reservoir 34 shown in all the figures broadly represents that the vent line 32 will often, at some point in the life of the bearing, contain some lubrication or grease 36. This could occur because, when the bearing is in a state of over-lubrication excess grease 36 will be expelled through the vent line 32. There is no requirement in the present invention that there be any actual physical element or reservoir at the end of the vent line 32. In one embodiment of the present invention, the vent line 32 can simply terminate as an open line. In that case, the vent line 32 is also the lubrication reservoir 34. Alternatively, the lubrication reservoir 34 could represent a separate physical container capable of holding grease, such as a bucket or catch basin, placed at the termination of vent line 32. In that case, the terminal end of vent line 32 could be placed above the body of grease, or within it, as shown in the figures. In a central lubrication system, the lubrication reservoir 34 could represent the common lubrication reservoir shared by the bearings on the system.

A more detailed view of the internal structure of lubrication vent block 24 is shown in FIGS. 2 to 5. The view is taken along line 2—2 in FIG. 1. The same view of a different embodiment of the present invention is shown in FIGS. 7 to 10.

In each of FIGS. 2 to 5 the elements of lubrication vent block 24 previously described may be seen. These include the connection means, threaded housing elements 26, 28, and 30, which connect the lubrication vent block 24 with the bearing block 10, grease fitting 18, and vent line 32 respectively.

FIGS. 2 to 5 also reveal a number of conduits internal to the lubrication vent block 24. The conduits provide for the passage of fluid from one end to the other under pressure or gravity. A first conduit, receiving conduit, or pressure grease conduit 38 connects with grease fitting 18. A second conduit, or vent conduit 40 connects to the vent line 32. The pressure grease conduit 38 and vent conduit 40 are joined by a valve conduit 42. The valve conduit 42 in turn connects with a bearing block or common conduit 44, which provides a flow path into the bearing block 10.

It can be appreciated by a person skilled in the art that while the preferred embodiment of the invention uses four internal conduits, other implementations are also possible. It will be appreciated that the preferred configuration provides that grease be admitted through a receiving means, transmitted to a bearing under the control of a valve means, and be permitted to flow in and out through a vent means, for example to a reservoir, under the control of the valve means, and that the particular structure employed, whether by a conduit or some other configuration, does not matter as long as the essential functions are provided.

In the preferred embodiment of the invention, the receiving means generally comprises a conduit to receive the lubrication, but it will be understood by those skilled in the art that the receiving means could take many forms, provided it functioned to receive lubrication. For example, in the preferred embodiment the receiving means comprises the first conduit, or pressure grease conduit 38, and may also include the second connection means of threaded housing 28. The vent means similarly comprehends any structure which permits expressing or venting of excess lubrication. For example, the vent means comprehends the second conduit, or vent conduit 40, and may also include the third connection means, threaded housing 30. The vent means may further comprehend the vent line 32 and lubrication reservoir 34. The valve means comprises any structure which can selectively open or close to permit passage of lubrication, and for example comprehends the valve conduit 42, and any components occupying said valve, such as valves or coil springs. The valve means may further comprehend the bearing block conduit 44 and first connection means, or output connector, threaded housing 26.

In the preferred embodiment of the invention, all of the internal conduits are free of obstruction except for the valve conduit 42, which contains a first valve member, shown in the figures as a floating piston 46. The first valve member acts as a one-way valve, allowing lubricant to be injected from the grease fitting 18 through the pressure grease conduit 38 into the system, but preventing any flow of fluid in the reverse direction. In essence, the pressure grease conduit 38, floating piston 46, and bearing block conduit 44 together replicate the functionality of the conventional bearing block system in which there is only one conduit, allowing only a one-way flow of grease to the bearing block 10.

Figure 2:
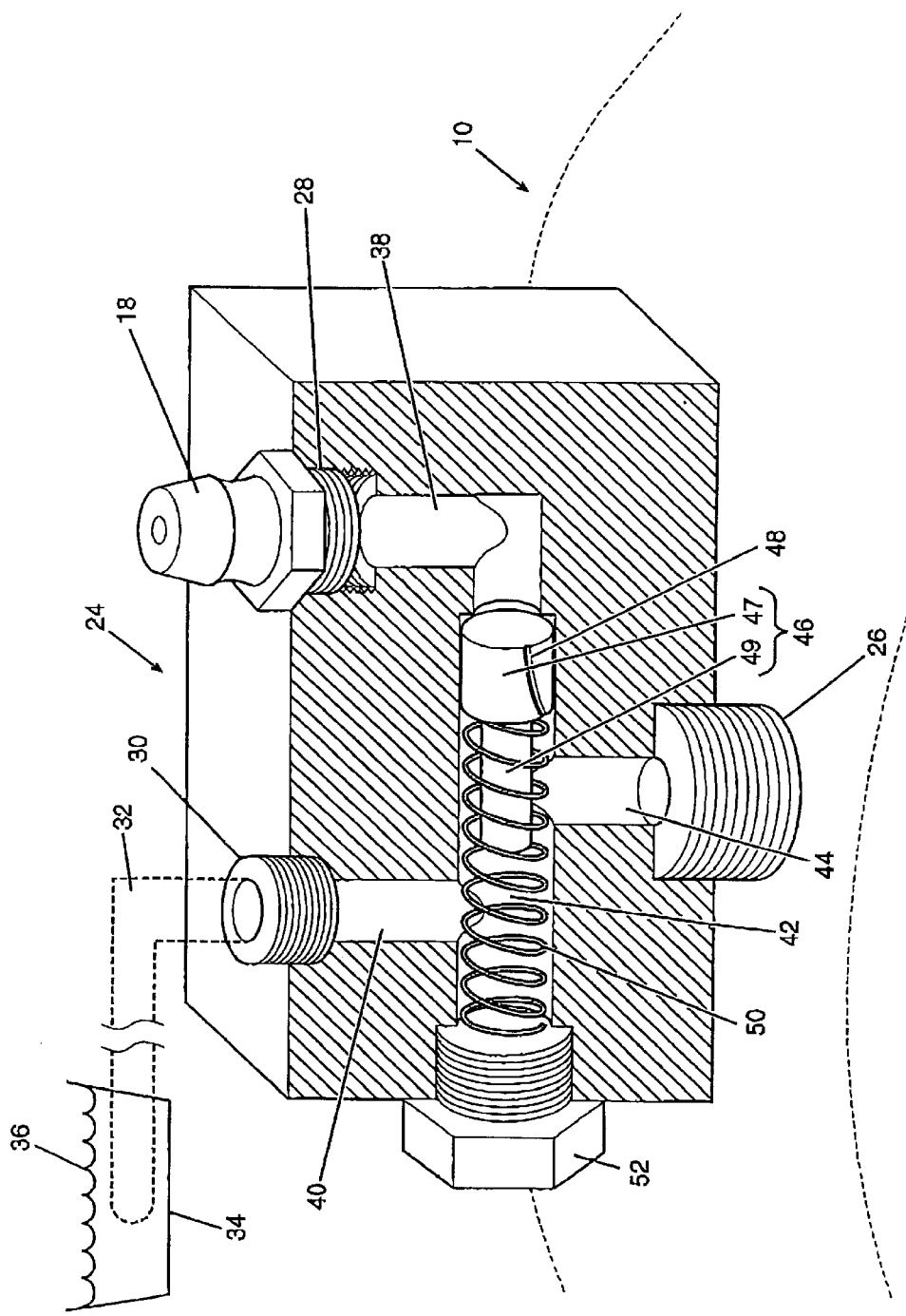
FIG. 2 is a cross-sectional view along line 2—2 of FIG. 1, showing the lubrication vent block in a neutral position.

In FIG. 2, the first valve member or one-way valve shown as floating piston 46 fits closely within the valve conduit 42, and is sized and shaped to move easily within the conduit. The floating piston 46 may be constructed from any hard, durable, corrosion and heat resistant material such as stainless steel or plastic. The floating piston 46 is shown with a piston head 47 and a piston shaft 49. The piston head 47 is sized and shaped to move easily within the conduit. The piston shaft 49 provides guidance so that the floating piston 46 avoids getting skewed or jammed as the piston moves back and forth within the conduit. The piston shaft 49 is also desirable to support a further valve, as discussed in more detail below.

As a further measure to minimize the risk that the floating piston 46 will jam or experience hydraulic lock, a bleed means in the form of a small bleed groove 48 is shown carved into one edge of the piston head 47. It can be appreciated that other means of avoiding hydraulic lock can also be used. For example, a capillary tube or small drill hole may be used to connect the pressure grease conduit 38 with the bearing block conduit 44 where it bolts into the housing.

A first biasing means, shown in the form of an elastically deformable element, coil spring 50, connects the floating piston 46 with a fixed surface, the opposing inner wall of the lubrication vent block 24, and biases the floating piston 46 so that, when no other force is present, the floating piston 46 rests in a first position, against the far right edge of the valve conduit 42. In that first position the floating piston 46 blocks the flow path through the pressure grease conduit 38.

As shown in FIGS. 2 to 5, a removable end plug 52 may be used to form the fixed surface at one end of the valve conduit 42. In that case the coil spring 50 could connect to the removable end plug 52, rather than an internal wall of the lubrication vent block 24. The benefit of using a removable end plug 52 is that when removed, access may be obtained to the otherwise inaccessible valve conduit 42, allowing maintenance and cleaning to be performed. Additionally, a lock nut may be used with removable end plug 52 so that the tension of coil spring 50 may be easily adjusted without having to remove the plug and replace the spring.

Operation of the lubrication vent block 24 can now be described, with reference to FIGS. 2 to 5.

FIG. 2 shows the lubrication vent block 24 in a neutral, or steady-state position that occurs when the machinery employing the bearing block 10 is pressure grease conduit 38.

Figure 3:
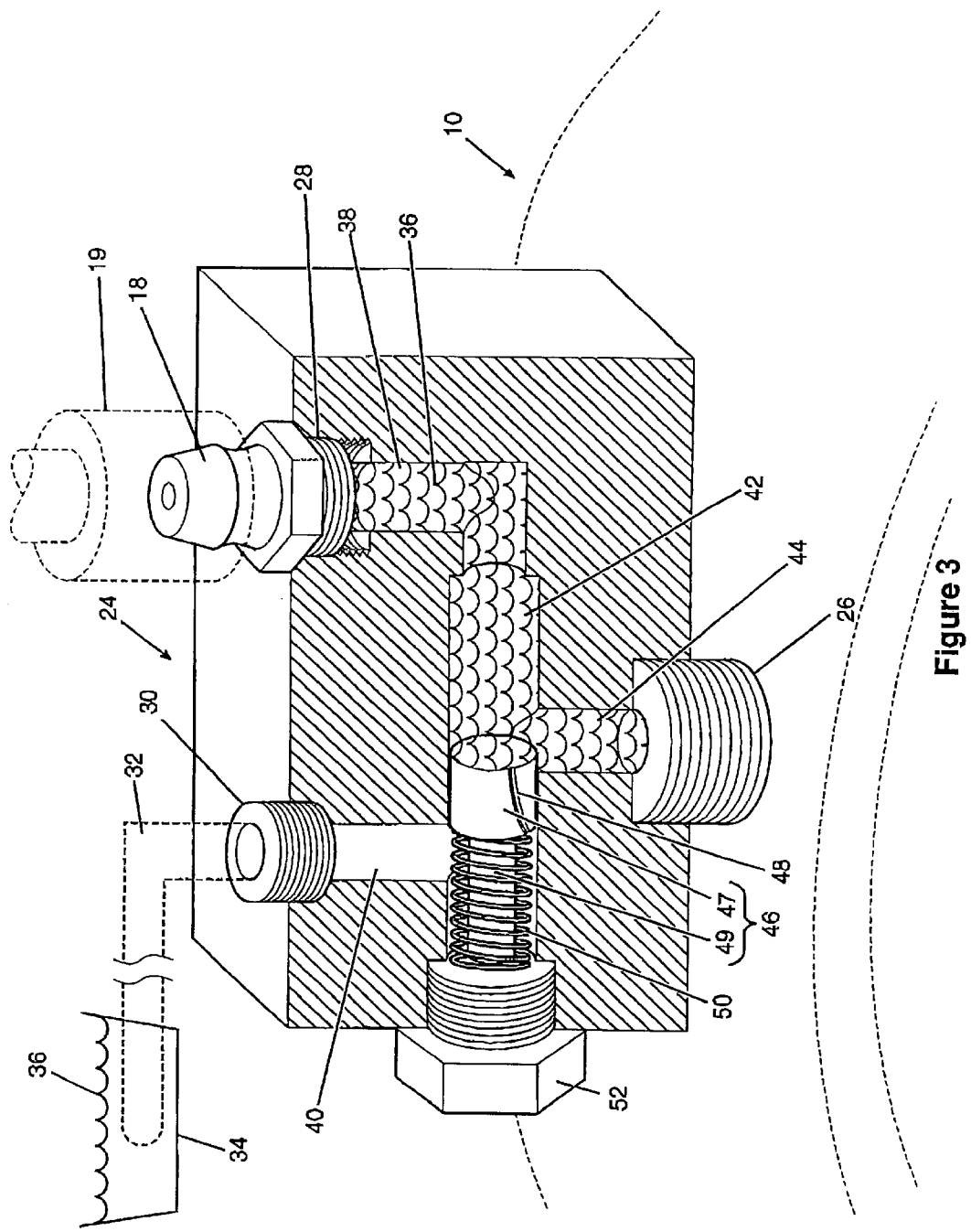
FIG. 3 is the same view as FIG. 2, in a lubricant injection position.

FIG. 3 shows the lubrication vent block 24 when grease 36 is injected from an outside source, shown in outline form as grease source 19, through grease fitting 18. This injection may occur at any time, regardless of whether the bearing block 10 is at rest or in operation, or if it is cold or hot. The injection of grease applies a certain pressure through grease fitting 18. As depicted in FIG. 3, the applied pressure in the conduit opposes and overcomes the bias imposed by coil spring 50. This causes the floating piston 46 to move away from the interface with the pressure grease conduit 38, and rest in a second position, at the interface with the vent conduit 40, blocking that conduit. The injected grease 36 is then free to flow through the pressure grease conduit 38, the bearing block conduit 44, and into the bearing block 10. At the same time, floating piston 46 blocks any grease from escaping or entering the vent conduit 40. When the grease source 19 is removed, the bias imposed by coil spring 50 reasserts itself and the floating piston 46 returns to its rest position, blocking the pressure grease conduit 38. In this manner the elements of the lubrication vent block 24 provide a one-way valve through the pressure grease conduit 38. It can now be understood that the valve means, comprising the valve conduit 42, floating piston 46, and coil spring 50, directs lubrication received by the receiving means, pressure conduit 38, into the bearing block.

Figure 4:
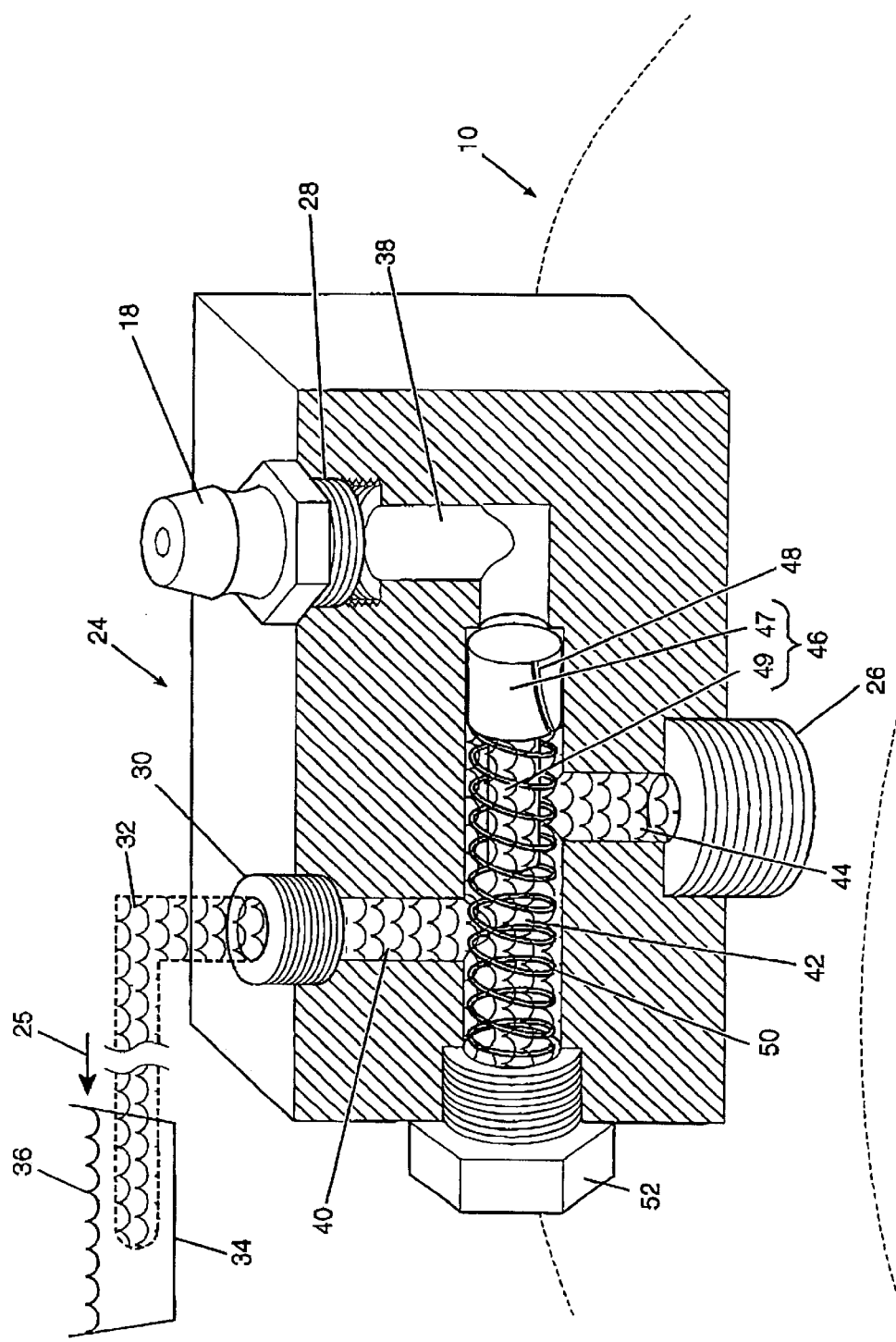
FIG. 4 is the same view as FIG. 2, where the bearing is in a state of over-lubrication.

In FIG. 4 the bearing block 10 is operating, hot, and in an over-lubrication condition. As discussed, the excess lubrication causes a churning effect and a corresponding rise in temperature and pressure. In a conventional bearing block, the pressure would be released by attempting to express the excess grease through the gaps 22 in the seal 15, as shown in FIG. 1, if the gaps are present in the system. If the gaps are not present, they may be created by this pressure, or, a blow-out may occur resulting in bearing failure. However, even if present, the gaps 22 rarely allow expulsion of ample amounts. Further, using gaps 22 to obtain needed venting is highly unsatisfactory because the grease is leaked in a messy and environmentally unsound manner, and is damaging to the seal 15. This is clearly contrary to the purpose of the seal 15, which is to keep grease inside the radial bearing, not allow it to escape.

These deficiencies with the conventional bearing block are addressed by the present invention. As shown in FIG. 4, the lubrication vent block 24 provides a low-resistance path for excess grease to flow out of the bearing block 10, in the direction shown by arrow 25, through the bearing block conduit 44 and vent conduit 40 and out through the vent line 32. Since this path offers low-resistance, the excess grease is more likely to flow through this controlled and environmentally sound path than it would be to leak out through gaps 22, if present. By venting excess grease in this way, excessive heat generation is avoided and there is no dangerous build-up of pressure. The risk of a blow-out of the seal 15 is greatly reduced, and the integrity of the seal 15 is preserved.

Generally, excess grease will be expelled immediately after it is injected, or upon the next start-up if the grease was injected when the bearing was cold. With the excess removed, the bearing should stabilize and maintain a steady-state operation for a reasonable time, as defined by the particular bearing's specifications. If in the interim there is a further excessive injection of grease then the expulsion process will repeat as described.

Figure 5:
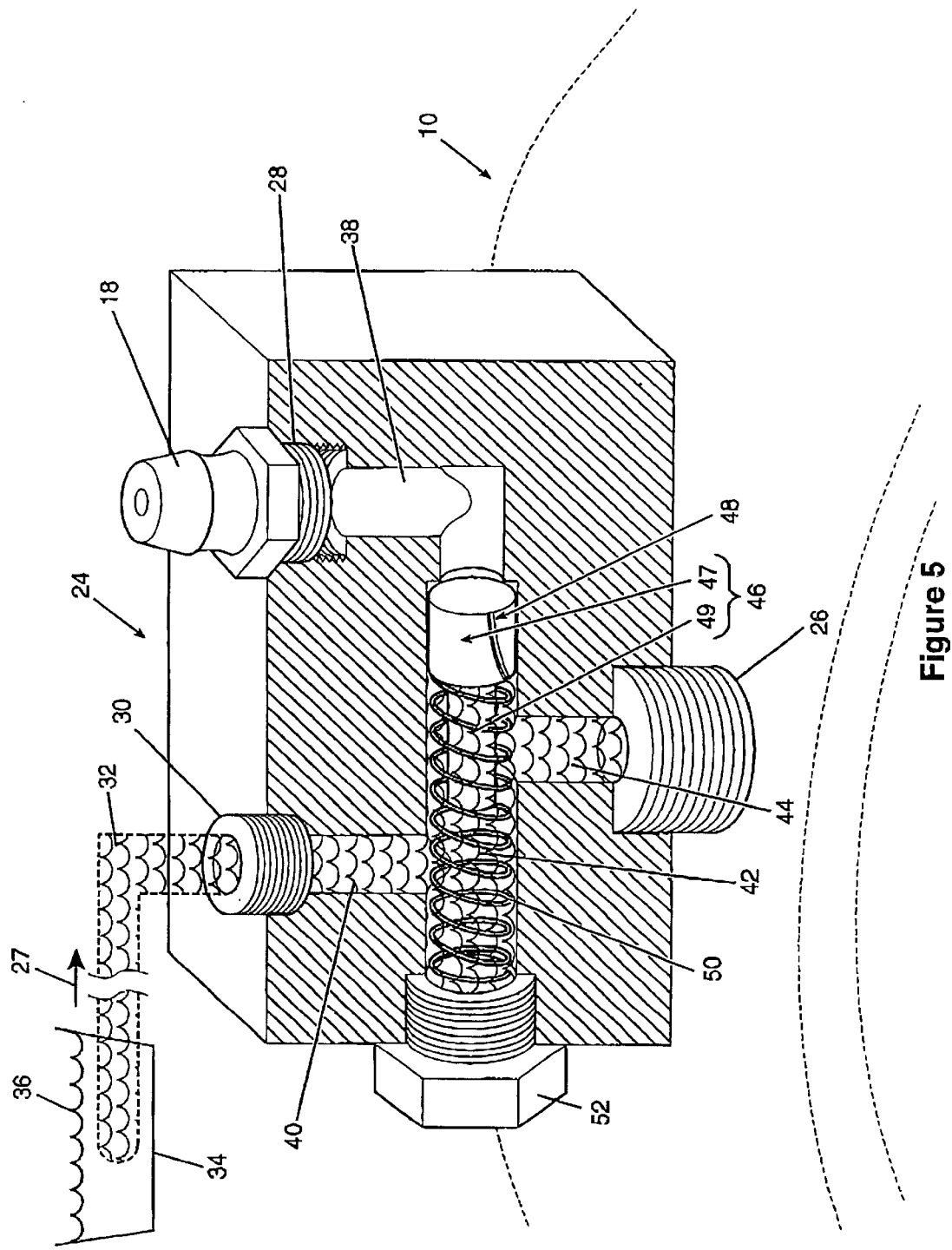
FIG. 5 is the same view as FIG. 2, where the bearing is cooling down.

FIG. 5 illustrates a parallel situation to that shown in FIG. 4. In this figure, the operating machinery has been shut off and the bearing block 10 is cooling down. As described, where the cooling down is rapid or the bearing block 10 has reached a particularly high temperature, there may be a negative pressure inside the bearing, or drop in internal pressure, and a partial vacuum created, drawing in fluid from the outside. In a conventional bearing block, the pressure imbalance created would again be relieved only through the gaps 22 in the seal 15 which, if present, would draw in water and other airborne particles that happen to be in the immediate environment. Again, the lubrication vent block 24 according to the present invention provides a low-resistance path for clean grease to be drawn into the bearing block 10, in the direction shown by arrow 27. Grease drawn from the vent conduit 40, or vent line 32, or external lubrication reservoir, as appropriate, would flow into the bearing through the vent conduit 40, valve conduit 42, and bearing block conduit 44. In general, the amount of fluid drawn in on cool-down is likely to be less than that expelled from over-lubrication. Nevertheless, it is desirable that this grease come from a controlled source and be as clean as possible, to minimize the amount of harmful contaminants that enter the bearing.

The availability of a low-resistance external path to which excess grease may be readily vented and from which clean grease may be readily drawn if there is a vacuum on cool-down represents a considerable improvement over the operation of the conventional bearing block. The risk of an undue rise in temperature or pressure, entry of contaminants, and ultimately, bearing failure, is greatly reduced by the controlled venting function performed by the present invention.

Another advantage of the present invention is that it provides, from the vent line 32 or lubrication reservoir 34, if they are connected, easily accessible samples of grease that can be analysed for purity. For example, the grease can be tested for the presence of oxidation, cage material, or other specific wear particles. This is an important practical benefit because over time, metal particles and other impurities can enter the grease, where they affect the performance of the bearing. In a traditional bearing block there is no equivalent sample source, and accordingly it is difficult to monitor the quality of the grease.

The lubrication vent block 24 shown in FIGS. 2 to 5 uses a single valve member that, as described, provides one-way access to the pressure grease conduit. Most of the time grease is not being injected, and the single valve means is biased to rest against the junction with the pressure grease conduit 38. As a result, there is an open path into the bearing block through the vent conduit 40 and bearing block conduit 44. Therefore, there is a possibility that contaminants may enter the bearing block from the outside. This is undesirable, as the internal elements of a bearing must have a positive mechanical seal separating them from the outside environment. Accordingly, it is necessary in this embodiment that the path through vent line 32 lead to a closed system. Accordingly, this embodiment of the invention is best used with central lubrication systems, since that type of system is already closed.

Figure 6:
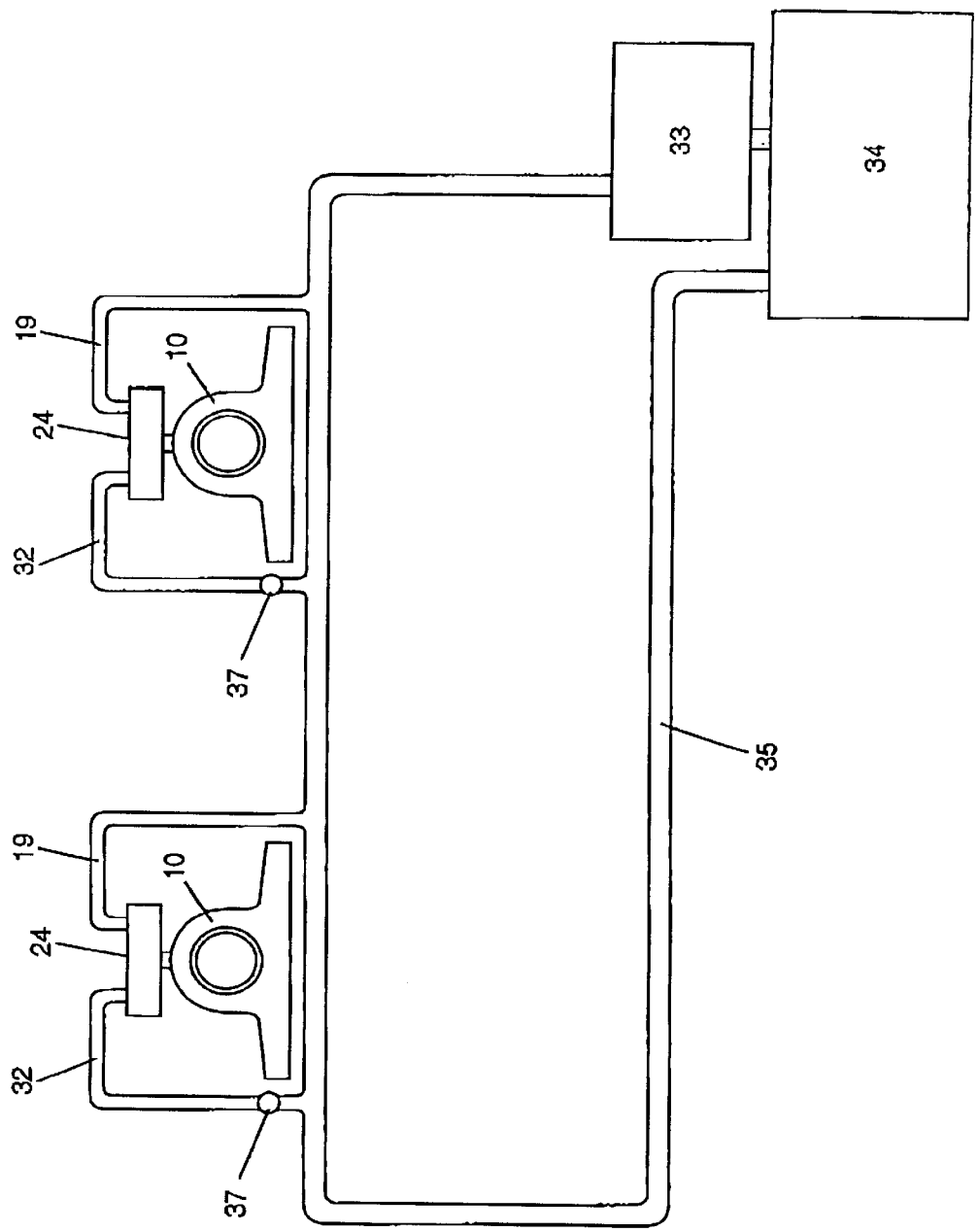
FIG. 6 shows the lubrication vent block used as part of a central lubrication system.

FIG. 6 shows the present invention used as part of a central lubrication system, using a representative sample of two bearing blocks 10. A pump 33 pumps grease drawn from the lubrication reservoir 34 through a main grease line 35. The main grease line 35 in turn feeds multiple grease sources 19, each of which feeds the lubrication vent block 24 servicing an individual bearing block on the system. In this case the grease source 19 would not be a grease gun, which requires manual operation by an attendant, but rather some sort of feed line configured to connect with the pressure grease conduit 38. The vent line 32 from each bearing block 10 connects back to the main grease line 35. There is a one-way valve 37 positioned on the vent line 32 which allows fluid to flow only in the direction from the lubrication vent block 24 to the main grease line 35. Fluid flow in the other direction is blocked. The central lubrication system shown in FIG. 10 accordingly has two lines going to each bearing block, a grease source line 19 and vent line 32. This contrasts with conventional central lubrication systems, which have only one feed line and no vent line.

In operation, the pump 33 pumps grease under pressure through the main grease line 35. Grease will accordingly flow under pressure through each of the grease sources 19 into the pressure grease channel 38 of each bearing block 10 in the system. Grease will not flow into the vent line 32 because of the presence of the one-way valve 37. If there is any excess grease in any bearing block it will be expelled, by the process described above, through vent line 32 into the main grease line 35, and eventually will return to the lubrication reservoir 34. If there is a negative pressure in any bearing, this will be most easily satisfied by the bearing drawing in grease sitting in the vent conduit 40 or vent line 32, rather than through any gaps in the seal.

It can now be seen that the lubrication vent block of the present invention manages the flow of lubrication through bearings connected in a central lubrication system so that the problems of over-lubrication and entry of contaminants through the seal are greatly reduced. This in turn lowers the risk of bearing failure. Additionally, since the present invention blocks the vent conduit 40 during greasing, it has the added advantage of ensuring that there is a positive feed of fresh grease into each bearing at all times. This overcomes the problem present in certain vented central lubrication systems, described above, where injected grease will simply flow out through the vent as soon as it is injected.

Yet a further benefit is that a central lubrication system of the type shown in FIG. 6 does not require the sophisticated metering system commonly required in current systems. Since there is a lubrication vent block 24 to manage the flow of lubrication through each bearing block, to vent any excess and allow for the ingress of clean grease automatically, there is much less danger of over-lubrication, and correspondingly much less of a need to monitor and regulate the volume of lubrication being injected to the same level of detail. Accordingly, a much simpler control mechanism may be used. For example, the pump 33 could operate from a simple periodic timer. Therefore, in addition to reducing the risk of bearing breakdown, the lubrication vent block of the present invention has the benefit of enabling use of central lubrication systems that are less costly to build and that are more reliable.

Another preferred embodiment of the present invention is shown in FIGS. 7 to 10. An aspect of this preferred embodiment is that it blocks the flow path between the vent conduit 40 and the valve conduit 42 when the bearing is not operating, or is operating in a steady-state. As a result, there is a reduced risk of entry of unwanted airborne particles, and the lubrication vent block 24 can be used advantageously without concern as to whether the vent line 32 and lubrication reservoir 34 are part of an open or closed system. For this reason, this preferred embodiment of the lubrication vent block 24 is particularly well suited for use with larger, stand-alone bearing blocks. Of course, this preferred embodiment may also be used with central lubrication systems and other closed systems.

This preferred embodiment is similar to the preferred embodiment shown in FIGS. 2–5 above, except there is added to the valve means a second valve member that controls fluid flow through the vent means, or vent conduit 40. The second valve member has a neutral position and at least one offset position, and preferably has two offset positions. The second valve member is biased by a second biasing means to block access to the vent means, vent conduit 40, when the bearing is in a steady-state or neutral operation. When it is biased in this way, the second valve member is in the neutral position. The second valve member will shift to one or more offset positions in response to a pressure differential between the bearing block 10 and bearing block conduit 44 on one side, and the vent conduit 40 on the other side. This pressure differential will usually occur when the bearing is not in a steady-state or neutral operation, for example, when there is excess grease caused by a condition of over-lubrication in the bearing or when there is a negative pressure caused by the bearing rapidly cooling down. When the second valve member is in an offset position it does not block access to the vent conduit 40.

In FIGS. 7–10 the second valve member is shown as secondary piston 54, positioned in the valve conduit 42. The secondary piston 54 is shown in a preferred form as a sleeve that fits and slides on the piston shaft 49. The secondary piston 54 connects on one side to the removable end plug 52 through coil spring 50, and on the other side to piston head 47 by the second biasing means, a separate coil spring 51. It can be appreciated that the second valve member, or secondary piston 54, can be implemented using other means as long as it fulfills the function of blocking the path through the vent conduit 40 when the bearing is in a neutral or steady-state operation, and opening the path when the bearing is not in a neutral or steady-state operation.

Figure 7:
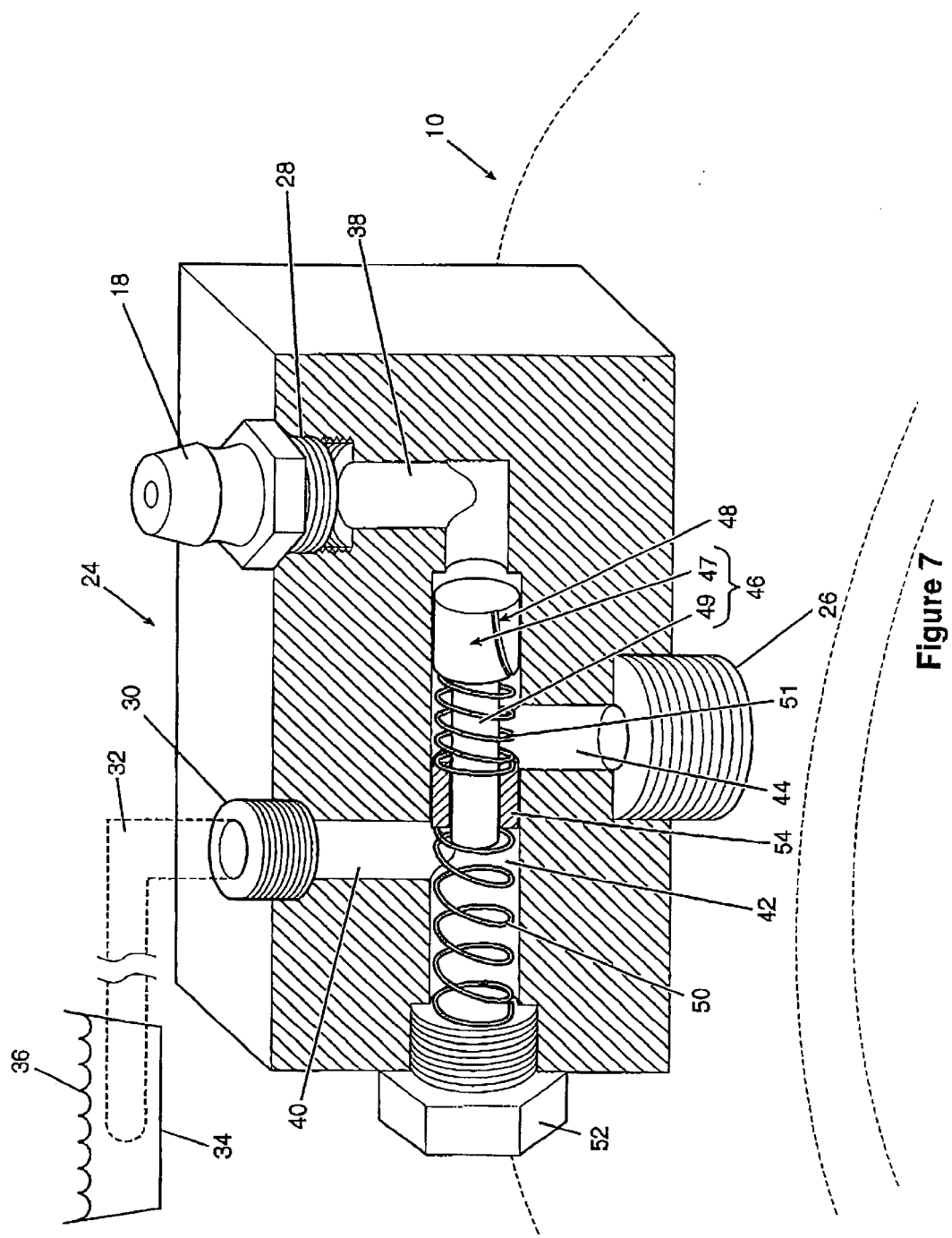
FIG. 7 is a cross-sectional view along line 2—2 of FIG. 1, showing the lubrication vent block in a neutral position, where the lubrication vent block contains a second valve member.
Figure 8:
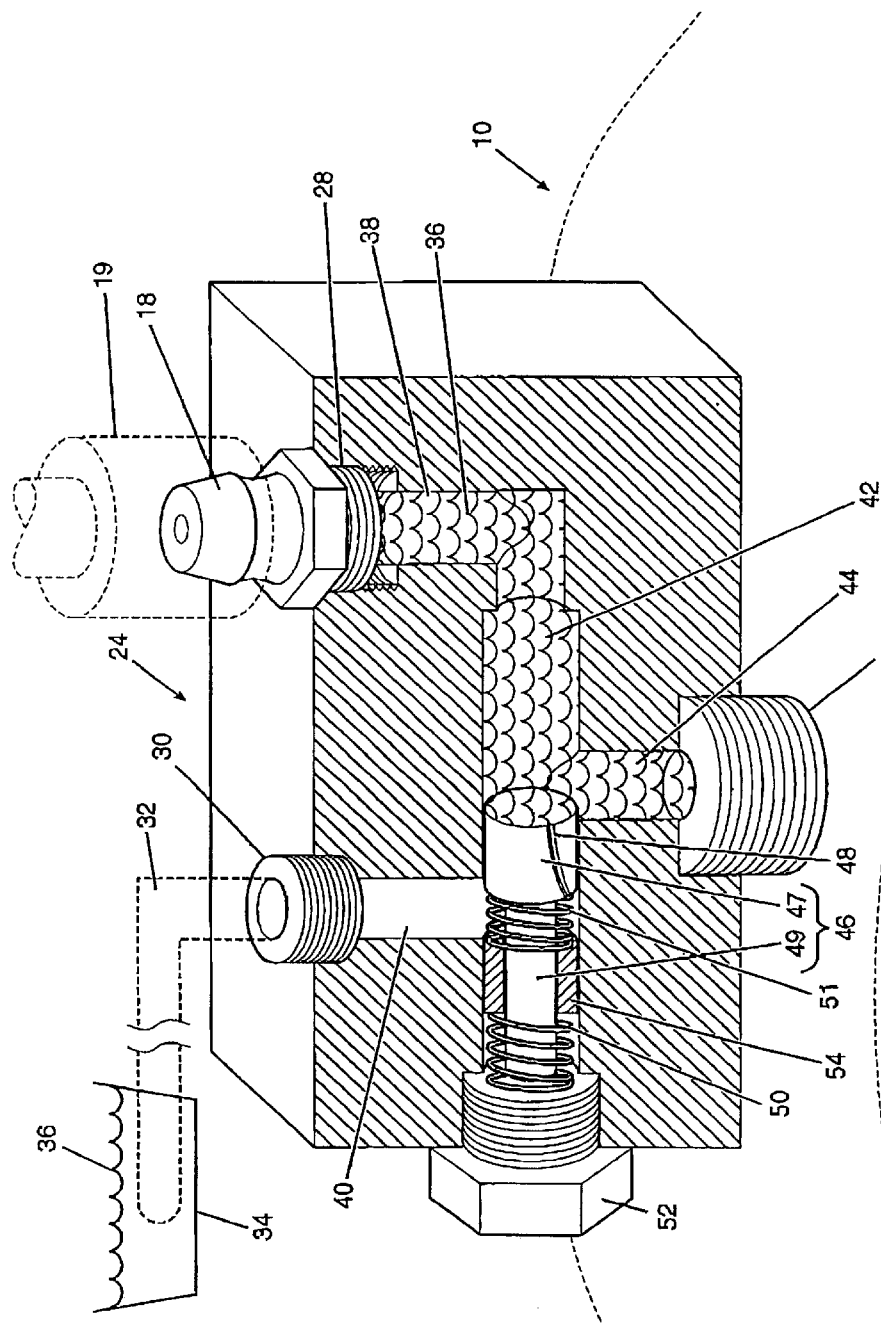
FIG. 8 is the same view as FIG. 7, in a lubricant injection position.
Figure 9:
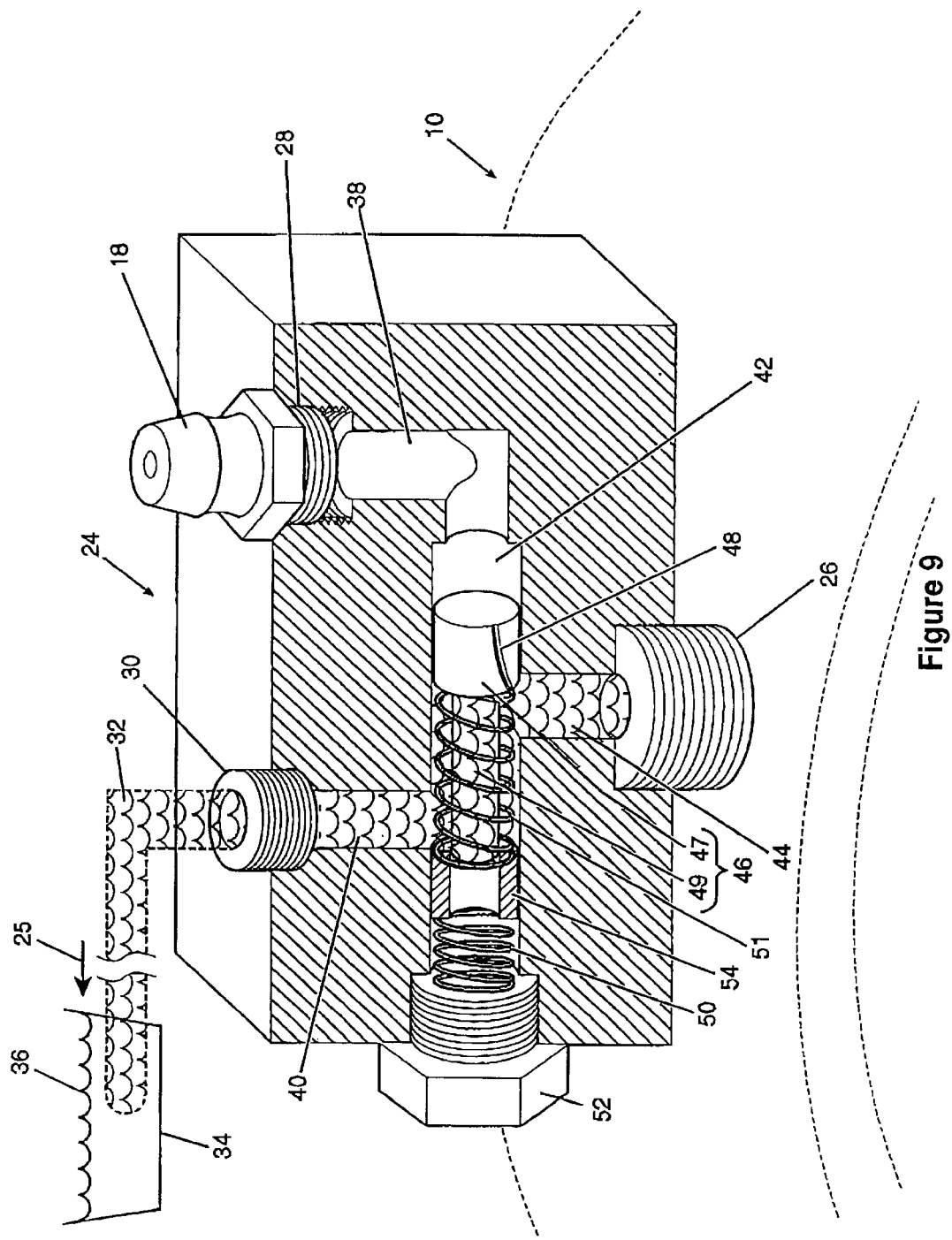
FIG. 9 is the same view as FIG. 7, where the bearing is in a state of over-lubrication.
Figure 10:
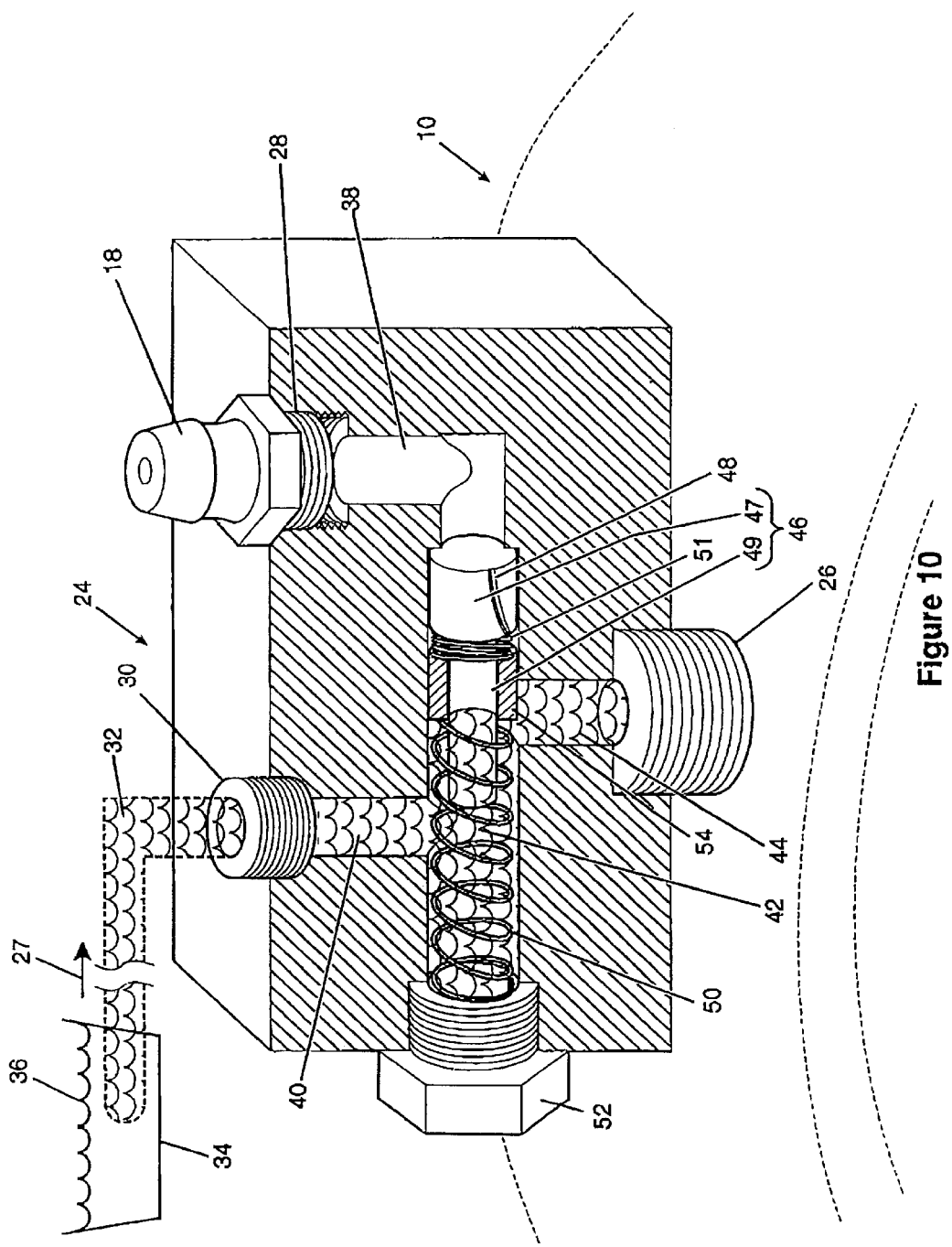
FIG. 10 is the same view as FIG. 7, where the bearing is cooling down.

FIG. 7 shows the bearing in neutral or steady-state operation, which occurs when the bearing is not in use, or when the bearing is operating and properly lubricated. In this case, the secondary piston 54 is biased in the neutral, or rest position, blocking access to the vent conduit 40. As shown in FIG. 8, when grease is injected through the grease fitting 18, the floating piston 46 blocks the vent conduit 40, as in the usual case. As shown in FIGS. 9 and 10, when there is either excess grease to be vented or a need to draw in grease on cool-down, the pressure differential between the bearing block conduit 44 and vent conduit 40 overcomes the bias on the secondary piston 54. This causes the secondary piston 54 to shift from its neutral or rest position, to an offset position, allowing grease to flow between the vent conduit 40 and bearing block conduit 44, in the direction indicated by arrows 25 and 27, in FIGS. 9 and 10, respectively.

More particularly, through the biases imposed by the coil springs 50 and 51, the secondary piston is configured so that when there is high pressure in the bearing block 10 due to over-lubrication, the secondary piston 54 is forced towards the removable end plug 52. Similarly, when the pressure in the bearing drops on cool-down, the secondary piston 54 shifts in the opposite direction, towards the pressure grease conduit 38. In either case it opens the path for grease to flow when needed, which is the desired result. In this regard it will be appreciated that the force required to move the secondary piston in either direction may be set according to the needs of the system, and need not be the same. The inflow and outflow of grease can occur at specific predetermined pressures, as set by the spring constants of coil springs 50 and 51, to ensure optimal grease pressure at all phases of operation of the bearing. It may be appreciated that other configurations and bias levels may also be used as long as there is the same desired result. It can now be appreciated how the elements of lubrication vent block 24 provide a two-way flow of grease through the vent conduit 40. It can now be understood that the valve means of this preferred embodiment, comprising the valve conduit 42, floating piston 46, secondary piston 54, and coil springs 50 and 51, directs excess lubrication out of the bearing block to the vent means. The valve means also opens the flow path into the bearing block from the vent means when there is a negative pressure in the bearing block.

In this embodiment of the invention, the presence of the second valve that blocks vent conduit 40 when the bearing is in steady-state operation greatly reduces the risk that outside impurities will be introduced. As a result, unlike the first embodiment, in this embodiment it is not necessary that the vent line 32 and lubrication reservoir 34 form a closed system. A vent line 32 consisting of a short section or elbow of tubing terminating in an open end may be sufficient, or may not even be needed at all. To maintain a clean environment it is desirable to place a catch basin or some other simple receptacle under the open end, to catch any excess grease that drips out.

This embodiment of the invention may therefore be generally preferred, since it is more convenient on the factory floor to just run a vent line 32 from the lubrication vent block 24 to an ordinary bucket or catch basin, rather than to a more complex enclosed system. The two-valve embodiment is accordingly more versatile, since it maintains the integrity of a sealed system in all situations and can therefore be used equally with both stand-alone bearings or central lubrication systems.

A second preferred embodiment of the present invention is shown in FIGS. 11 and 12. This second embodiment may be used with a variety of fluid-using devices 10 such as hydraulic devices that use hydraulic fluid, as well as lubricated devices such as bearings that use a grease or lubrication fluid. Accordingly, this preferred embodiment may be more broadly described as a fluid regulating device 24. FIG. 11a shows a version of the second preferred embodiment having only a first valve member, floating piston 46, while FIG. 11b and the remaining figures show the corresponding version with the addition of a second valve member 54. As noted, the version having two valve members shown in FIG. 11b is generally preferred, and accordingly further description of the second preferred embodiment will concentrate on this version.

In this second preferred embodiment there is a receiving means to receive fluid under pressure from an external source, a vent, operatively connected to the fluid-using device, to vent fluid from the fluid regulating device, and a valve assembly, to limit the passage of fluid through the fluid regulating device. Similar to the previous embodiment, in this second preferred embodiment the receiving means is represented as the first or receiving conduit 38, the vent is represented as the second or vent conduit 40, and the valve assembly comprises the first valve member 46 and second valve member 54 in valve conduit 42. The valve assembly also includes the first biasing means 50 that urges the first valve member 46 to a first position substantially closing the flow path through the receiving conduit 38, and the second biasing means 51 that urges the second valve member to a neutral position. The fluid, whether hydraulic fluid or lubrication, is injected under pressure at input fitting 18.

Figure 11A:
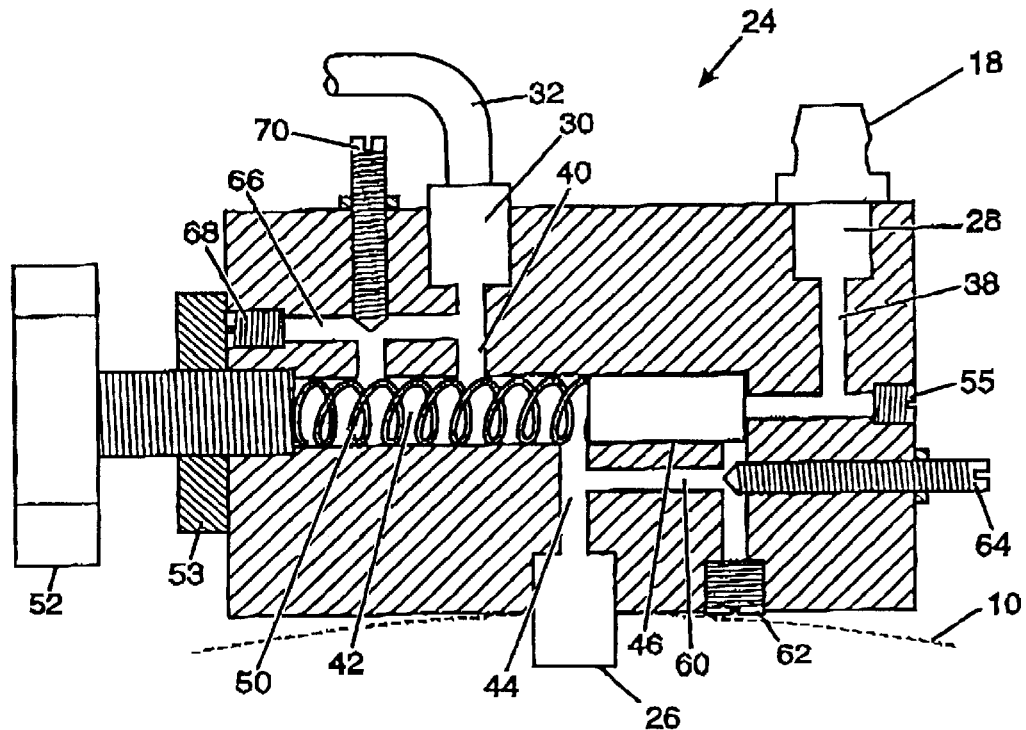
FIG. 11a is a cross-sectional view of another preferred embodiment of the lubrication vent block of the present invention, showing a fluid regulating device in a neutral position.
Figure 11B:
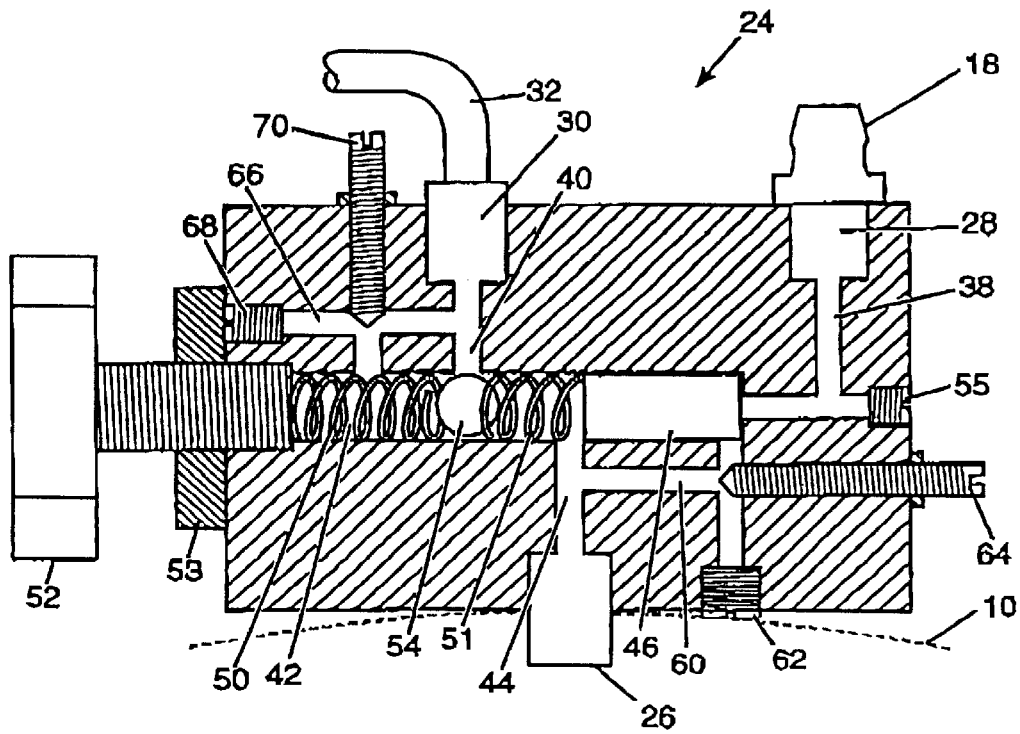
FIG. 11b is a cross-sectional view of the fluid regulating device of FIG. 11a, where the fluid regulating device contains a second valve member.

Referring to FIG. 11*b*, it may be seen that in this embodiment floating piston 46 is longer, and has a length that extends from the interface with the receiving conduit 38 to the edge of the common conduit 44. Piston shaft 49 has been removed, so that floating piston 46 is reduced to a cylinder or piston without a shaft. Further, bleed groove 48 has also been removed from floating piston 46.

The second valve member 54 is now represented by a steel ball instead of the sliding bushing or piston used in the earlier embodiment. It can be appreciated that besides steel, the ball 54 may be made from other materials that are similarly strong and durable. The ball 54 is sized and shaped so that it can roll relatively easily within the valve conduit 42, while being large enough to substantially block contaminants from entering the device 24 through vent conduit 40. It has been found that a clearance space of about ³⁄₁₀₀₀" to ⁵⁄₁₀₀₀" between the ball 54 and inner wall of valve conduit 42 has produced adequate results. There is generally a layer of fluid surrounding the ball 54 and filling the clearance space. Together the ball 54 and fluid layer act to substantially block contaminants from entering the device 24 through vent conduit 40, particularly when the ball 54 is in the neutral position, blocking vent conduit 40. However, the ball 54 is sized and shaped so that when subjected to pressure fluid can flow around ball 54 through the clearance space.

Another aspect of the second preferred embodiment is that, as discussed earlier, drill holes or back pressure channels have been introduced as a means of avoiding hydraulic lock. A first bypass or back pressure conduit 60, also called regulator conduit 60, is provided between the receiving conduit 38 and the common conduit 44. This back pressure conduit 60 terminates in an end plug 62 on one surface, and a regulator or adjustable needle valve 64 on another surface.

The regulator is operatively connected between the receiving means or conduit 38 and the fluid-using device 10, and as will be shown below is positioned to regulate the pressure of the injected fluid. In the present embodiment the regulator is adjustable needle valve 64, and the pressure regulation comprises using needle valve 64 to adjust the size of an opening in regulator conduit 60. The needle valve 64 is threaded into the fluid regulating device 24 and extends outside of the device 24. It can be appreciated that manual rotation of needle valve 64 will cause the valve 64 to extend or retract within regulator conduit 60. The fluid will experience a drop in pressure as it passes through the opening created by needle valve 64 in regulator conduit 60, since the opening is generally a constriction or narrowing of regulator conduit 60.

Similarly, a second bypass or back pressure conduit 66 has also been provided between the vent conduit 40 and valve conduit 42, terminating in an end plug 68 and adjustable needle valve 70. In conduit 66 adjustable needle valve 70 may be replaced by a non-adjustable end plug if desired. Removable end plug 52 has a threaded connection with device 24, so that manual rotation by a user adjusts the position of end plug 52 in or out along valve conduit 42. It can be appreciated that inward movement of end plug 52 will increase the pressure on the biasing means present in valve conduit 42, in this case coil springs 50 and 51, and thereby increase the bias on floating piston 46. A lock nut 53 is shown around the threaded shaft of end plug 52. Lock nut 53 may be tightened to secure the position or setting of end plug 52 after end plug 52 has been rotated to establish the desired bias on floating piston 46. Finally, receiving conduit 38 is shown extended to the edge of the device 24, terminating in end plug 55. This extension of receiving conduit 38 simply reflects the fact that this part of the conduit is most conveniently constructed by drilling a hole from the opposing edge of the device 24 at the location of end plug 55.

The back pressure conduits 60 and 66 are useful in reducing the risk of hydraulic lock, which can occur when movement of a valve member is blocked due to the conduit on the other side of the valve member being filled with fluid. When fluid is being injected into receiving conduit 38, there is a risk of hydraulic lock of the secondary valve member or ball 54 due to fluid present in the valve conduit 42. This risk is reduced in this embodiment, as the fluid can now vent or bleed into the second back pressure conduit 66. Similarly, when the fluid injection is stopped there is a risk of hydraulic lock of the floating piston 46 as it attempts to return to its first or rest position against the far right edge of the valve conduit 42, due to fluid present in the receiving conduit 38. Again this risk is reduced in this embodiment, as the fluid can now vent or bleed into the first back pressure conduit 60.

Figure 11C:
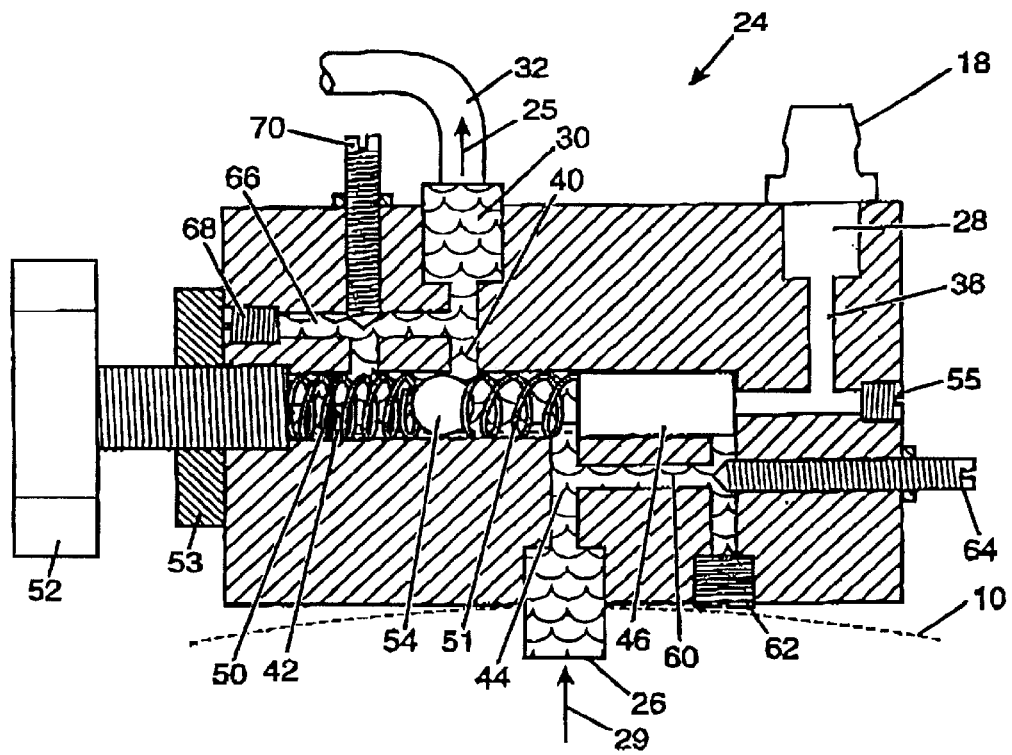
FIG. 11c is a view of the device of FIG. 11b, where the fluid-using device is in a state of over-lubrication.
Figure 11D:
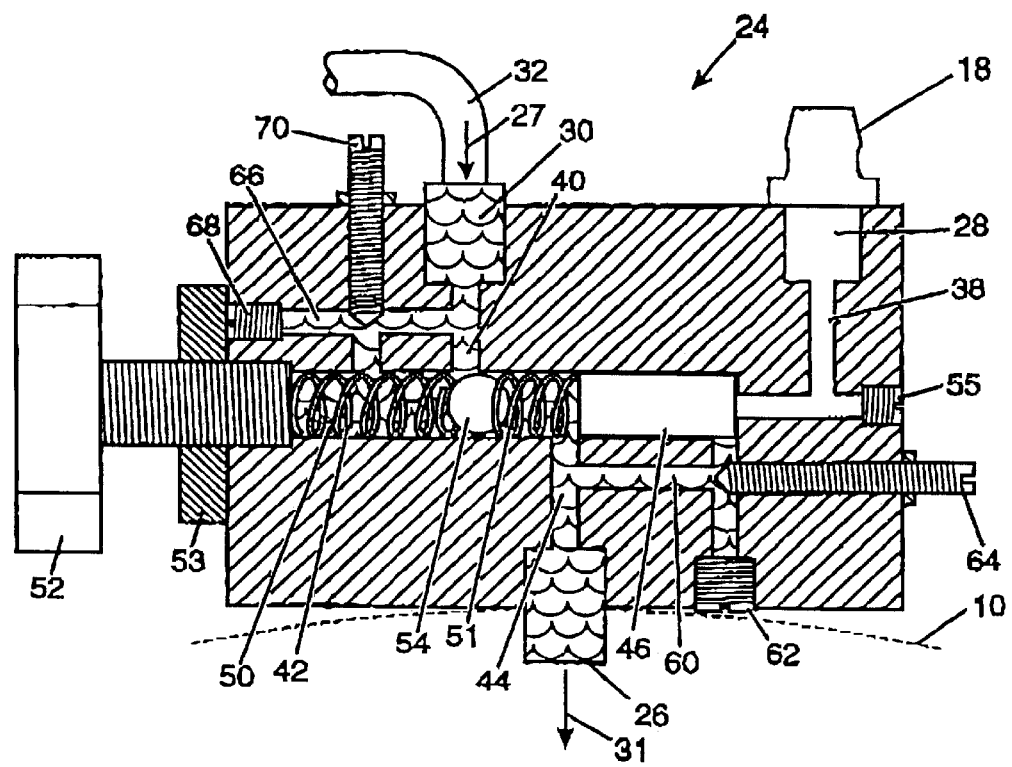
FIG. 11d is a view of the device of FIG. 11b, where the fluid-using device is cooling down.

In each of FIGS. 11*a* to 11*d* the floating piston 46 is shown in its first position, at the interface with the receiving conduit 38, where it substantially blocks receiving conduit 38. In FIG. 11*b* the device 24 is shown in the neutral position, as there is no flow of fluid in or out of the device 24, and the secondary valve member or ball 54 is in its neutral position, biased by first biasing means 50 and second biasing means 51 to block vent conduit 40. FIG. 11*c* shows excess fluid being vented from the fluid-using device 10 in the direction of arrow 25 through vent conduit 40. Venting is enabled by movement of the ball 54 to an offset position in the direction of removable end plug 52, which substantially opens a flow path through vent conduit 40. Similarly, FIG. 11*d* shows the situation when the fluid-using device 10 is being rapidly cooled, creating an internal vacuum or negative pressure. The vent line 32 and vent conduit 40 is configured to enable fluid to enter the fluid regulating device 24. The second valve member or ball 54 permits fluid to be drawn in through vent conduit 40 to the fluid-using device 10, as the fluid path can flow around ball 54 in the clearance space between ball 54 and the inner wall of valve conduit 42.

It can be appreciated that movement of the ball 54 is facilitated by the presence of the second back pressure conduit 66 in this embodiment of the invention. It can also be appreciated that the bias imposed on ball 54 from the coil springs 50 and 51 should be relatively low to enable the ball 54 to move responsively between its neutral and offset positions. A bias requiring a pressure differential of about 5 lbs to move ball 54 has been found to be adequate, and in general it is preferable that the bias not exceed about 10 lbs in pressure.

The first back pressure conduit 60 is known as the regulator conduit 60 because, in addition to relieving hydraulic lock, this conduit also functions in this embodiment as the main feed channel by which fluid is delivered to fluid-using device 10. In this arrangement the floating piston 46 is sized and shaped to block fluid from entering the common conduit 44 through the valve conduit 42. Instead, the pressure of the injected fluid in receiving conduit 38 will push floating piston 46 to an offset position and expose a path through the regulator conduit 60 in which fluid may flow. It can be appreciated that floating piston 46 will move to the offset position fairly easily because, as noted, the biasing means is set fairly low. In this embodiment floating piston 46 has at least one offset position, and may have many offset positions to reflect the many different possible pressures of the injected fluid.

The flow of fluid through regulator conduit 60 will be regulated by the size of the opening created by the regulator or needle valve 64. It can be appreciated that this opening will vary in size depending on the degree to which the needle valve 64 has been turned by the operator. As the size of the opening created by the needle valve 64 is increased, the greater will be the drop in pressure. Past the regulator 64, the fluid can flow at the reduced or regulated pressure directly into the common conduit 44 and into the fluid-using device 10.

In the second preferred embodiment there is a further distinction in that a vent path will usually be available during injection of the fluid. Unlike the previous embodiment, in which the vent conduit 40 was always fully blocked by floating piston 46 when it moved to its second or offset position, in this embodiment floating piston 46 does not directly block vent conduit 40. Instead, in the offset position it at least partially blocks the interface between common conduit 44 and valve conduit 42. In effect floating piston 46 at least partially blocks vent conduit 40, since the path that fluid would take to vent must pass through this interface. The net result however is that as long as the interface between common conduit 44 and valve conduit 42 is at least partly open, a path from the fluid-using device to vent is available. Therefore, in the present embodiment fluid injected into the fluid regulating device 24 may flow into the fluid-using device 10 as before, or alternatively may flow out of the device 24 through vent conduit 40. The particular path taken by the fluid during a given injection of fluid under pressure will depend on the relative difference in back pressure between the fluid-using device 10 and the path to vent.

The back pressure into the fluid-using 10 depends in part on whether the fluid-using device is full of fluid or has any remaining unfilled capacity. Where there is unfilled capacity, the back pressure will be relatively low and will depend mostly on the nature of any inherent restrictions at the fluid-using device input. When the fluid-using device 10 is at full capacity, the back pressure will be relatively high and will depend mostly on the material strength of the fluid-using device 10. Where the device 10 is a bearing, this pressure will be largely related to the condition and rating of the seal 15.

The back pressure into the vent path will depend primarily on the extent to which floating piston 46 blocks the interface between common conduit 44 and valve conduit 42. This in turn depends on the position of the regulator or needle valve 64. The more needle valve 64 is closed, the higher will be the pressure on floating piston 46, causing it to move further to the left and blocking a greater portion of the interface of common conduit 44 and valve conduit 42. This has the effect of increasing the back pressure into the vent path. Similarly, back pressure into the vent will decrease the more needle valve 64 is opened. The ball 54 will tend to be moved away from its neutral position blocking vent conduit 40 by the pressure of coil spring 51 and, since the bias on it is low, by the pressure in the system itself.

The relationship of the needle valve 64 and floating piston 46, and their effect on fluid flow is illustrated in FIG. 12. FIG. 12a shows the limiting case where the needle valve 64 completely closes the regulator conduit 60, so that fluid cannot flow to the common conduit 44. The full input pressure of the injected fluid is exerted on floating piston 46, which causes it to move to its farthest offset position where it completely blocks the interface with common conduit 44. From this case it can also be appreciated that, as noted, floating piston 46 is sized and shaped so that it completely blocks common conduit 44 to fluid in receiving conduit 38. Therefore fluid cannot flow to the fluid-using device 10 through valve conduit 42 as in the previous embodiment.

Figure 12A:
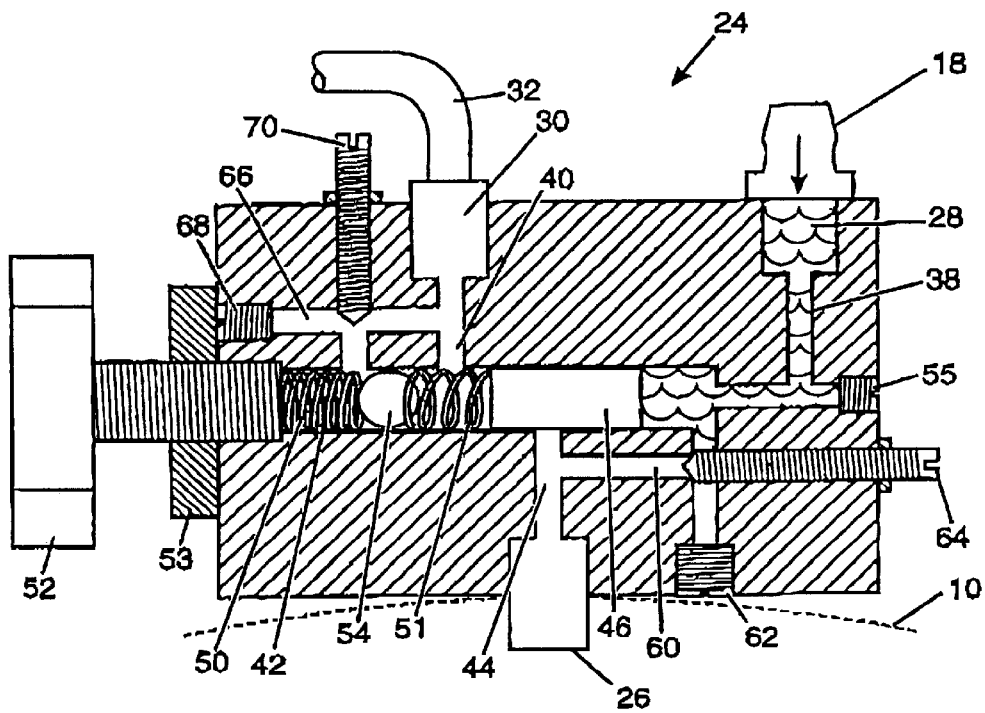
FIG. 12a is a view of the device of FIG. 11b, where the fluid-using device is in a fluid injection position and a needle valve member is in a completely closed position.
Figure 12B:
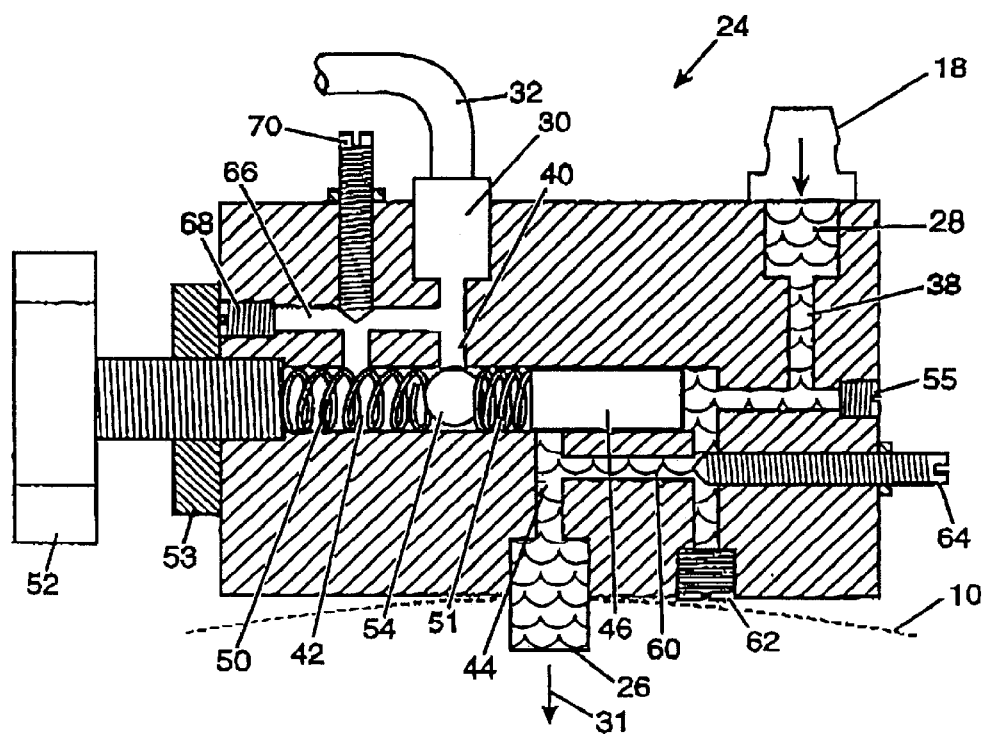
FIG. 12b is the same view as FIG. 12a, where the needle valve member is in a partly open position.

In FIG. 12b the needle valve 64 is opened slightly, permitting fluid to flow to the fluid-using device 10. Since the opening is relatively small there will again be a significant input pressure at floating piston 46, causing it to move by a relatively large offset where it again completely blocks the interface with common conduit 44. FIG. 12b accordingly illustrates the situation of the previous embodiment, in which all the injected fluid is directed to the fluid-using device 10 and there is no opportunity for vent at the time of injection.

Figure 12C:
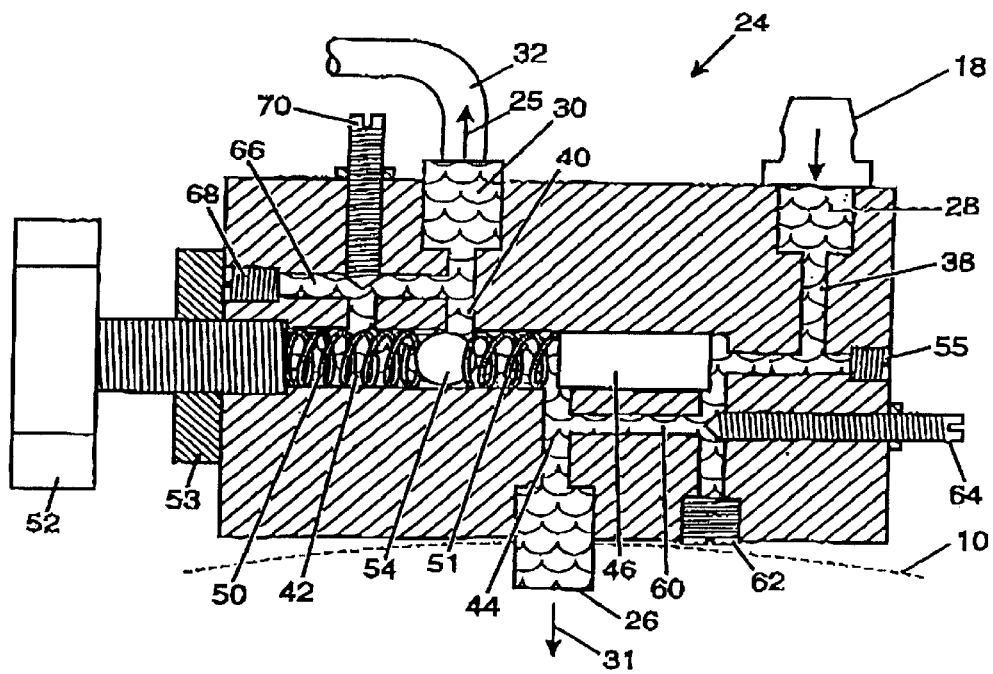
FIG. 12c is the same view as FIG. 12B, where the needle valve member is in a more fully open position.
Figure 12D:
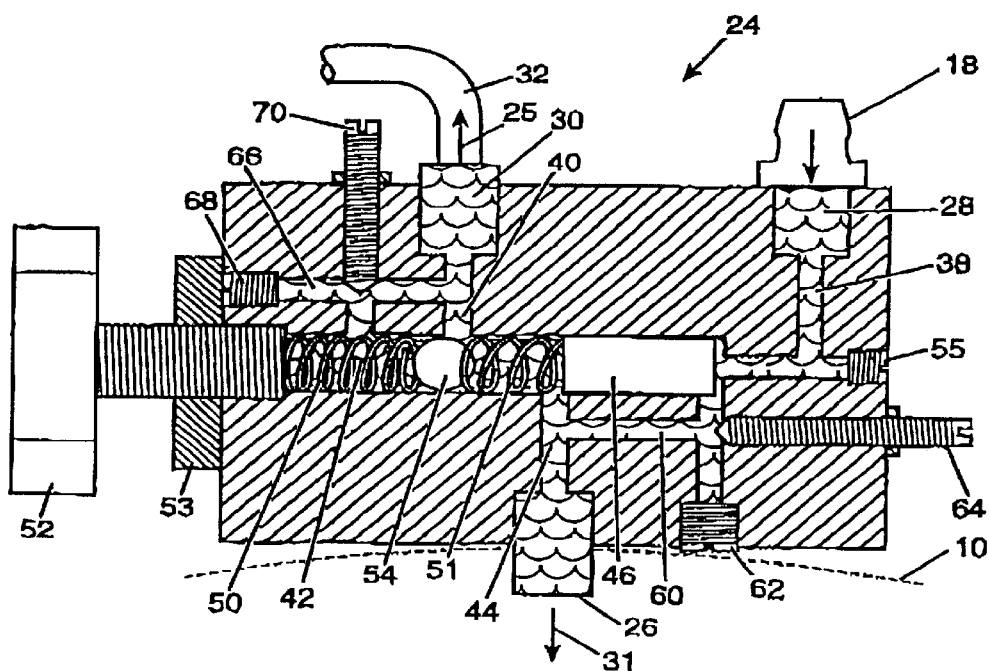
FIG. 12d is the same view as FIG. 12c, where the needle valve member is in a more fully or completely open position.

FIGS. 12c and 12d illustrate the new vent functionality available in this second preferred embodiment of the invention. In both figures the needle valve 64 is open so that floating piston 46 partially but not completely blocks the interface of valve conduit 42 with common conduit 44. The needle valve 64 is in a more closed position in FIG. 12c, and is almost completely open in FIG. 12d. Accordingly, floating piston 46 is offset a greater amount in FIG. 12c and presents a higher vent back pressure. It can be appreciated that the fluid pressure in the common conduit 44 will be higher for the needle valve setting of FIG. 12c than that of FIG. 12d.

As shown in the figures, the fluid flow upon injection will pass through receiving conduit 38, regulator conduit 60, and then either into the fluid-using device 10 in the direction of arrow 31, or vent out of the fluid regulating device 24 in the direction shown by arrow 25. In particular, by setting the regulator or needle valve 64 appropriately, the device 24 can be configured so that the fluid flow will be generally directed into the fluid-using device 10 when the fluid-using device 10 is at less than full capacity, and will be generally directed away from the fluid-using device 10 and out the vent conduit 40 when the fluid-using device 10 is at full capacity. In this way, fresh fluid is provided to the fluid-using device 10 when needed to fill the fluid-using device 10, and is vented when the fluid-using device 10 is full and pressurized to a predetermined pressure. In such a case, the excess fluid is not needed by the device 10 and is vented.

It can be appreciated that this embodiment provides the benefit of enabling the operator to inject fluid into a fluid-using device 10 without concern that too much is being injected, since any excess will be vented. Further, by observing the vent line 32 the operator will receive immediate feedback that the fluid-using device 10 is full, and can stop injecting further fluid at that point. In the case where the fluid-using device 10 is a bearing and the fluid is a grease or lubricant, the risk of overgreasing and consequent bearing failure is significantly reduced. The reduction in risk provided by the present invention may enable increased use of more effective oil-retention type seals rather than the leak-prone purgable type seals in common use.

It can also be appreciated that this second preferred embodiment represents an improvement over the previous embodiment. In the previous embodiment the lubrication vent block 24 vented excess grease after injection but not during injection. The operator did not receive immediate feedback when the bearing 10 was at full capacity and accordingly could potentially overgrease or undergrease the bearing. While any excess grease would be vented by the running bearing after injection, during the injection itself there remained a residual risk of overgreasing, which could degrade or even blow-out the bearing. The present embodiment has the further advantage of reducing the risk of under-filling, since the operator can inject fluid continuously until the bearing or fluid-using device 10 is full. The present embodiment accordingly provides feedback to the operator on the state of fill of the bearing or fluid-using device 10 that has not been available in the prior art.

In practice, the fluid regulating device 24 may be provided with a regulator or needle valve 64 setting that is predetermined to provide effective fill and vent relief for a fluid-using device 10 having a particular input or operating pressure, and that is receiving a fluid of a given viscosity at a flow rate within a specified range. Where the regulator 64 is a needle valve, a dial having convenient numerical markings indicating different predetermined settings may be fitted over the needle valve for this purpose. It can be appreciated that the fluid regulating device 24 may be provided in a variety of sizes to accommodate the many different sizes of fluid-using devices, and in particular the wide variations in fluid flow rates.

Alternatively, the setting of the needle valve 64 can be made while checking the pressure at the output connector 26 to the fluid-using device 10, in this way actually calibrating the position of the needle valve 64 to a specific injection pressure or flow rate. Whether by calibration or by adjustment relative to a scale, the present invention comprehends having the needle valve 64 positioned relative to the receiving conduit 38 and the first valve member 46 to allow fluid to be directed into the fluid-using device 10 at a predetermined fill pressure, which once exceeded, results in additional or excess fluid being vented.

This embodiment of the invention may be used with continuous pump or injection systems, and therefore comprehends hydraulic devices in addition to the lubricated devices comprehended by the previous embodiment. For example, in hydraulic systems having a central pump it is common for devices located farther from the pump to receive fluid at a lower pressure than those devices more closely located. If the devices are fitted with the fluid regulating device 24 of the present invention, excess fluid directed to the closer devices will vent and be fed to the more remote devices, equalizing pressure throughout the system. As with the lubricated devices, the risk of over-injection is reduced and any excess fluid will be safely vented through the vent line 32.

It can now be appreciated that the lubrication vent block 24 manages the flow of lubrication in a bearing block by providing a predetermined and low-resistance path for excess lubrication to vent, and through which clean grease, rather than contaminants, may enter the bearing when necessary. This is cleaner and safer than the current system, where there is either a dangerous build-up of pressure, or undesirable venting through the high-resistance path of gaps in the seal. The present invention makes worry-free maintenance possible, since operators or centrally controlled systems can regularly inject fresh grease without concern that an excess of grease in the bearing will result in over-lubrication. Damage to the seal caused by inadvertent over-lubrication is similarly reduced. Ultimately, the reduction in excess heat and pressure and improvement in seal quality made possible by the present invention not only reduces the risk of bearing failure, but improves the efficiency of the running bearing, leading to productivity benefits as well.

It will be appreciated that the foregoing description is in respect of preferred embodiments of the invention and that various modifications are possible within the broad scope of the appended claims. Some of these modifications have been discussed above and others will be apparent to those skilled in the art. For instance, while the lubrication vent block 24 has been shown as an attachment to a traditional bearing block 10, it could also be constructed as an integral part of a bearing block. Another possibility is to use a single lubrication vent block 24 to manage the lubrication of a multiple number of bearing blocks 10. In that case the bearing block conduit 44 would connect with the threaded housing 20 of all the bearing blocks 10, in parallel. Also, the bearing blocks would be able to share a single lubrication reservoir 34.

I claim:

1. A fluid regulating device for use in regulating fluid in a fluid-using device, said fluid regulating device comprising:
   (a) a receiving means, to receive fluid under pressure from an external source;
   (b) a vent, operatively connected to said fluid-using device, to vent fluid from the fluid regulating device;
   (c) a valve assembly, for limiting the passage of fluid through said fluid regulating device to both said fluid-using device and to said vent upon fluid being received under pressure from an external source; and
   (d) an adjustable regulator, operatively connected between said receiving means and said fluid-using device, to adjustably regulate an injection pressure of said fluid; wherein, upon fluid being received by said receiving means, said valve assembly directs said fluid to said fluid-using device at said regulated pressure or to aid vent.

2. The fluid regulating device according to claim 1, wherein said fluid-using device is a lubricated device and said fluid is lubrication.

3. The fluid regulating device according to claim 1, wherein said fluid-using device is a hydraulic device and said fluid is a hydraulic fluid.

4. The fluid regulating device according to claim 1, wherein the receiving means comprises a first conduit and the vent comprises a second conduit, and wherein the valve assembly includes a first valve member operating between said first and second conduit and having a first position and at least one offset position, and a first biasing means for urging said first valve member to said first position.

5. The fluid regulating device according to claim 4, wherein upon fluid being received by said receiving means, said first valve member is moveable from said first position to said at least one offset position, where said first valve member at least partially blocks the flow path through the second conduit, and in the absence of fluid being received by said receiving means, said first biasing means biases said first valve member to said first position, to substantially close the flow path through the first conduit and substantially open the flow path through said second conduit.

6. The fluid regulating device according to claim 5, wherein upon said first valve member moving into said at least one offset position, said fluid received by said receiving means is regulated by said regulator and is directed to said fluid-using device at said regulated pressure.

7. The fluid regulating device according to claim 6, further including a regulator conduit to provide a path for said fluid to flow from said receiving means to said fluid-using device.

8. The fluid regulating device according to claim 7, wherein said regulator is a valve that controls the size of an opening in said regulator conduit.

9. The fluid regulating device according to claim 6, wherein said fluid-using device has a capacity, and upon said fluid-using device reaching said capacity said fluid received by said receiving means is vented from said fluid regulating device through said vent.

10. The fluid regulating device according to claim 4, wherein the valve assembly includes a second valve member having a neutral and at least one offset position, and a second biasing means for urging said second valve member to said neutral position.

11. The fluid regulating device according to claim 10, wherein said second valve member substantially closes said second conduit in said neutral position.

12. The fluid regulating device according to claim 11, wherein, upon the fluid-using device containing an excess of fluid, said second valve member is moveable from said neutral position to said offset position, to substantially open a flow path through the second conduit.

13. The fluid regulating device according to claim 12, wherein said second valve member permits fluid to be drawn through said second conduit to said fluid-using device by a negative pressure arising in said fluid-using device.

14. The fluid regulating device according to claim 4, wherein the first biasing means is an elastically deformable element slidably connecting the first valve member to a fixed surface.

15. The fluid regulating device according to claim 14, wherein the fixed surface has an adjustable position, and wherein the bias of said first biasing means can be varied by adjusting the position of said fixed surface.

16. The fluid regulating device according to claim 1, wherein upon an excess of fluid arising in the fluid-using device, said excess fluid is vented from said fluid-using device through said vent.

17. The fluid regulating device according to claim 16, further including a fluid reservoir, to receive fluid vented from said fluid regulating device, wherein said excess fluid passes through said vent to said fluid reservoir.

18. The fluid regulating device according to claim 1, wherein said vent is sized and shaped to permit ingress of fluid into said fluid-using device through said vent, said ingress occurring upon a negative pressure arising in said fluid-using device.

19. A method of managing fluid in a fluid-using device, which comprises:
   (a) providing a fluid regulating device having a receiving means to receive fluid under pressure from an external source, a vent, operatively connected to said fluid-using device, to vent fluid from the fluid regulating device, a valve assembly, for limiting the passage of fluid through said fluid regulating device to both said fluid-using device and to said vent upon fluid being received under pressure from an external source, and an adjustable regulator, operatively connected between said receiving means and said fluid-using device, to adjustably regulate an injection pressure of said fluid;
   (b) connecting a fluid output connector of the fluid regulating device to a fluid input connector of the fluid-using device;
   (c) connecting an external fluid source to the receiving means of said fluid regulating device;
   (d) adjusting said adjustable regulator to a regulated pressure; and
   (e) injecting fluid from said external fluid source under pressure, said valve assembly directing said fluid to the fluid-using device at said regulated pressure or to said vent.

20. A method of managing fluid in a fluid-using device according to claim 19, wherein said fluid-using device has a capacity, and said valve assembly directs said fluid to said vent in step (e) upon said fluid-using device reaching said capacity.

21. A fluid regulating device for use in regulating fluid in a fluid-using device, said fluid regulating device comprising:
   (a) a receiving means, to receive fluid under pressure from an external source;
   (b) a vent, operatively connected to said fluid-using device, to vent fluid from the fluid regulating device;
   (c) a valve assembly, for limiting the passage of fluid through said fluid regulating device to both said fluid-using device and to said vent upon fluid being received under pressure from an external source; and
   (d) a regulator, operatively connected between said receiving means and said fluid-using device, to regulate an injection pressure of said fluid into the fluid-using device; wherein, upon fluid being received by said receiving means, said valve assembly directs said fluid first to said fluid-using device at said regulated pressure and then to said vent.

22. A fluid regulating device for use in regulating fluid in a fluid-using device, said fluid regulating device comprising:
   (a) a receiving means, to receive fluid under pressure from an external source;
   (b) a vent, operatively connected to said fluid-using device, and being sized and shaped to vent fluid from the fluid regulating device and to permit ingress of fluid into said fluid-using device, said ingress occurring upon a negative pressure arising in said fluid-using device;
   (c) a valve assembly, for limiting the passage of fluid through said fluid regulating device; and
   (d) a regulator, operatively connected between said receiving means and said fluid-using device, to regulate a pressure of said fluid;
      wherein, upon fluid being received by said receiving means, said valve assembly directs said fluid to said fluid-using device at said regulated pressure.

23. A fluid regulating device for use in regulating fluid in a fluid-using device, said fluid regulating device comprising:
   (a) a receiving means, to receive fluid under pressure from an external source, said receiving means comprising a first conduit;
   (b) a vent, operatively connected to said fluid-using device, to vent fluid from the fluid regulating device, said vent comprising a second conduit;
   (c) a valve assembly, for limiting the passage of fluid through said fluid regulating device, said valve assembly including:
      (i) a first valve member operating between said first and second conduit and having a first position and at least one offset position, and
      (ii) a first biasing means for urging said first valve member to said first position, said first biasing means comprising an elastically deformable element slidably connecting the first valve member to a fixed surface; and
   (d) a regulator, operatively connected between said receiving means and said fluid-using device, to regulate a pressure of said fluid;
      wherein, upon fluid being received by said receiving means, said valve assembly directs said fluid to said fluid-using device at said regulated pressure.

24. The fluid regulating device according to claim 23, wherein said fixed surface has an adjustable position, and wherein the bias of said first biasing means can be varied by adjusting the position of said fixed surface.

25. A fluid regulating device for use in regulating fluid in a fluid-using device, said fluid regulating device comprising:
   (a) a receiving means, to receive fluid under pressure from an external source, said receiving means comprising a first conduit;
   (b) a vent, operatively connected to said fluid-using device, to vent fluid from the fluid regulating device, said vent comprising a second conduit;
   (c) a valve assembly, for limiting the passage of fluid through said fluid regulating device, said valve assembly including:
      (i) a first valve member operating between said first and second conduit and having a first position and at least one offset position,
      (ii) a second valve member having a neutral and at least one offset position, wherein said second valve member substantially closes said second conduit in said neutral position,
      (iii) a first biasing means for urging said first valve member to said first position; and
      (iv) a second biasing means, for urging said second valve member to said neutral position, and
   (d) a regulator, operatively connected between said receiving means and said fluid-using device, to regulate a pressure of said fluid;
      wherein, upon fluid being received by said receiving means, said valve assembly directs said fluid to said fluid-using device at said regulated pressure,
      and wherein, upon the fluid-using device containing an excess of fluid, said second valve member is moveable from said neutral position to said offset position, to substantially open a flow path through the second conduit,
      and wherein, upon a negative pressure arising in said fluid-using device, said second valve member permits fluid to be drawn through said second conduit to said fluid-using device.

* * * * *